US012573790B2

(12) United States Patent
Ikeda et al.

(10) Patent No.: US 12,573,790 B2
(45) Date of Patent: Mar. 10, 2026

(54) CONNECTOR-EQUIPPED ELECTRICAL WIRE AND CONNECTOR HOUSING

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yoshitaka Ikeda, Osaka (JP); Hirokazu Komori, Osaka (JP); Sho Murakami, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 370 days.

(21) Appl. No.: 18/266,441

(22) PCT Filed: Dec. 2, 2021

(86) PCT No.: PCT/JP2021/044177
§ 371 (c)(1),
(2) Date: Jun. 9, 2023

(87) PCT Pub. No.: WO2022/130988
PCT Pub. Date: Jun. 23, 2022

(65) Prior Publication Data

US 2024/0047921 A1 Feb. 8, 2024

(30) Foreign Application Priority Data

Dec. 16, 2020 (JP) ................................ 2020-208587

(51) Int. Cl.
*H01R 13/533* (2006.01)
*H01R 13/52* (2006.01)

(52) U.S. Cl.
CPC .......... *H01R 13/533* (2013.01); *H01R 13/52* (2013.01); *H01R 2201/26* (2013.01)

(58) Field of Classification Search
CPC ... H01R 13/533; H01R 13/52; H01R 2201/26
(Continued)

(56) References Cited

U.S. PATENT DOCUMENTS 4,867,711 A * 9/1989 Yuasa ............... H01R 13/4362 439/744
5,203,722 A * 4/1993 Kinoshita .......... H01R 13/4362 439/752
(Continued)

FOREIGN PATENT DOCUMENTS

JP H10-012317 A 1/1998
JP 2002-352902 A 12/2002
JP 2006-114288 A 4/2006

OTHER PUBLICATIONS

International Search Report issued on Feb. 15, 2021 for WO 2022/130988 A1 (4 pages).

*Primary Examiner* — Harshad C Patel
(74) *Attorney, Agent, or Firm* — Venjuris, P.C.

(57) ABSTRACT

A connector-equipped electrical wire includes a connector housing in which a cavity is formed and a terminal-equipped electrical wire inserted into the cavity. In a first state before full fastening by a full fastening portion is achieved and in which a first cavity communicates with a second cavity corresponding thereto, a first portion of the terminal-equipped wire is configured to pass through the second cavity and fit into the first cavity, and a second portion of the terminal-equipped wire is fitted into the second cavity. In a second state in which full fastening by the full fastening
(Continued)

portion is achieved, when observed in an axial direction of the cavity, a regulatory surface of an inner surface of the second cavity approaches closer to the second portion than when in the first state.

14 Claims, 12 Drawing Sheets

(58) Field of Classification Search
USPC ............................................................ 439/2
See application file for complete search history.

(56) References Cited

U.S. PATENT DOCUMENTS

| | | | | | |
|---|---|---|---|---|---|
| 5,252,096 | A * | 10/1993 | Okada | H01R 13/4362 | 439/752 |
| 5,299,959 | A | 4/1994 | Yamamoto et al. | | |
| 5,358,427 | A * | 10/1994 | Miwa | H01R 13/4362 | 439/752 |
| 5,358,431 | A | 10/1994 | Yamamoto et al. | | |
| 5,378,176 | A * | 1/1995 | Sasai | H01R 13/4362 | 439/752 |
| 5,437,565 | A * | 8/1995 | Atsumi | H01R 13/4362 | 439/752 |
| 5,464,356 | A * | 11/1995 | Nebeshima | H01R 13/4362 | 439/752 |
| 5,613,868 | A * | 3/1997 | Ohsumi | H01R 13/5221 | 439/275 |
| 5,797,772 | A * | 8/1998 | Sakurai | H01R 13/4362 | 439/752 |
| 5,848,919 | A * | 12/1998 | Nagano | H01R 13/4362 | 439/752 |
| 6,010,374 | A * | 1/2000 | Miwa | H01R 13/4362 | 439/752 |
| 6,739,908 | B2 * | 5/2004 | Hamai | H01R 13/6278 | 439/275 |
| 6,902,443 | B2 * | 6/2005 | Hara | H01R 13/4362 | 439/752 |
| 7,114,991 | B2 * | 10/2006 | Shiga | H01R 13/5208 | 439/587 |
| 7,156,698 | B2 * | 1/2007 | Yamashita | H01R 13/5208 | 439/587 |
| 7,182,652 | B2 * | 2/2007 | Yamakado | H01R 13/4362 | 439/752 |
| 7,278,890 | B1 * | 10/2007 | Smutny | H01R 13/4361 | 439/752 |
| 8,337,244 | B2 * | 12/2012 | Sawamura | H01R 13/5208 | 439/271 |
| 8,550,845 | B1 * | 10/2013 | Osterhart | H01R 13/4362 | 439/752 |
| 9,128,410 | B2 * | 9/2015 | Suzuki | G03G 15/0812 | |
| 9,484,660 | B2 * | 11/2016 | Shuey | H01R 13/4362 | |
| 10,566,737 | B2 * | 2/2020 | Ochiai | H01R 13/62955 | |
| 10,587,071 | B2 * | 3/2020 | Masui | H01R 13/64 | |
| 10,622,746 | B2 * | 4/2020 | Abraham | H01R 13/4362 | |
| 2015/0140847 | A1 * | 5/2015 | Kanemura | H01R 13/62938 | 439/259 |
| 2020/0254944 | A1 * | 8/2020 | Hashimoto | B60R 16/0207 | |

* cited by examiner

CONNECTOR-EQUIPPED ELECTRICAL WIRE AND CONNECTOR HOUSING

CROSS REFERENCE TO RELATED APPLICATIONS

This application is a national phase of PCT application No. PCT/JP2021/044177, filed on 2 Dec. 2021, which claims priority from Japanese patent application No. 2020-208587, filed on 16 Dec. 2020, all of which are incorporated herein by reference.

TECHNICAL FIELD

The present disclosure relates to a connector-equipped electrical wire and a connector housing.

BACKGROUND

Patent Document 1 discloses a technology for suppressing vibration of a terminal-equipped electrical wire inside a connector housing. In Patent Document 1, vibration suppression is achieved by providing a protrusion on the terminal. This protrusion is provided to protrude toward the inner surface of a cavity in the connector housing from a crimped part or the like.

PRIOR ART DOCUMENT

Patent Document

Patent Document 1: WO 2019/082941 A1

SUMMARY OF THE INVENTION

Problems to be Solved

It is desired to suppress vibration of a terminal-equipped electrical wire inside a connector housing, while suppressing the effect on the inner surface of the cavity when the terminal is inserted into the cavity.

In view of the above, on object is to provide a technology that can suppress vibration of a terminal-equipped electrical wire inside a connector housing without needing to provide a protrusion on the terminal.

Means to Solve the Problem

A connector-equipped electrical wire of the present disclosure includes a connector housing in which a cavity is formed, and a terminal-equipped electrical wire including an electrical wire and a terminal connected to an end portion of the electrical wire, and inserted into the cavity, the connector housing including a first housing and a second housing mounted on a rear end side of the first housing, a first cavity being formed in the first housing as a portion of the cavity, a second cavity being formed in the second housing as another portion of the cavity, a portion of the terminal-equipped wire that is fitted into the first cavity being a first portion and a portion of the terminal-equipped wire that is fitted into the second cavity being a second portion, the connector housing being provided with a full fastening portion that maintains a mounted state of the first housing and the second housing, in a first state before full fastening by the full fastening portion is achieved and in which the first cavity communicates with the second cavity corresponding thereto, the first portion being configured to pass through the second cavity and fit into the first cavity, and the second portion being fitted into the second cavity, and in a second state in which full fastening by the full fastening portion is achieved, when observed in an axial direction of the cavity, a regulatory surface of an inner surface of the second cavity approaching closer to the second portion than when in the first state.

Effect of the Invention

According to the present disclosure, vibration of a terminal-equipped electrical wire inside a connector housing can be suppressed without needing to provide a protrusion on the terminal.

DETAILED DESCRIPTION TO EXECUTE THE INVENTION

Description of Embodiments of Disclosure

Figure 1:
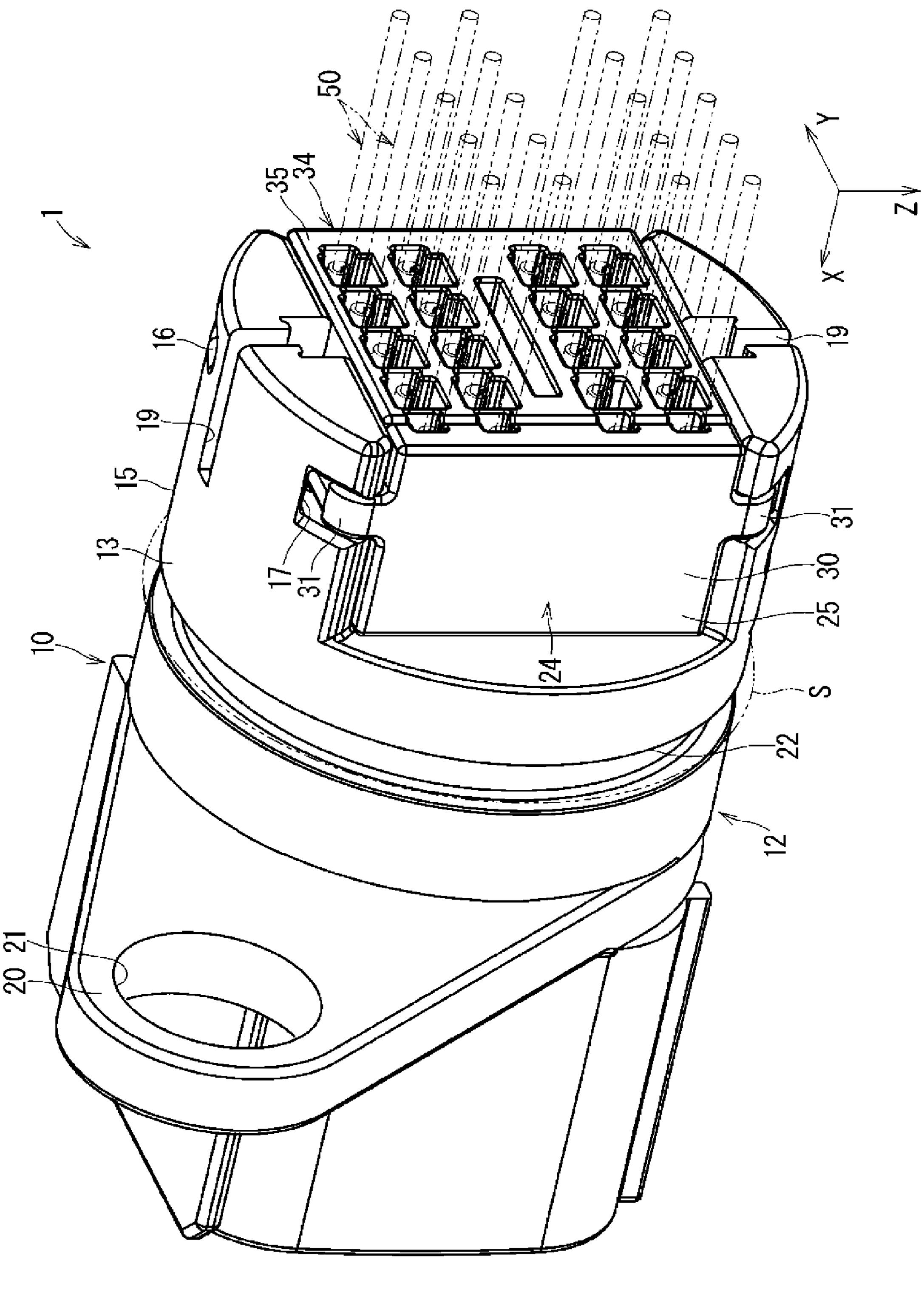
FIG. 1 is a perspective view showing a connector-equipped electrical wire according to a first embodiment.

Initially, modes of the present disclosure will be enumerated and described.

A connector-equipped electrical wire of the present disclosure is as follows.

(1) A connector-equipped electrical wire including a connector housing in which a cavity is formed, and a terminal-equipped electrical wire including an electrical wire and a terminal connected to an end portion of the electrical wire, and inserted into the cavity, the connector housing including a first housing and a second housing mounted on a rear end side of the first housing, a first cavity being formed in the first housing as a portion of the cavity, a second cavity being formed in the second housing as another portion of the cavity, a portion of the terminal-equipped wire that is fitted into the first cavity being a first portion and a portion of the terminal-equipped wire that is fitted into the second cavity being a second portion, the connector housing being provided with a full fastening portion that maintains a mounted state of the first housing and the second housing, in a first state before full fastening by the full fastening portion is achieved and in which the first cavity communicates with the second cavity corresponding thereto, the first portion being configured to pass through the second cavity and fit into the first cavity, and the second portion being fitted into the second cavity, and in a second state in which full fastening by the full fastening portion is achieved, when observed in an axial direction of the cavity, a regulatory surface of an inner surface of the second cavity approaching closer to the second portion than when in the first state. In the second state, vibration suppression of the terminal-equipped wire inside the connector housing is achieved, due to the regulatory surface of the inner surface of the second cavity approaching closer to the second portion than when in the first state. It is thereby possible to suppress vibration of the terminal-equipped wire inside the connector housing without needing to provide a protrusion on the terminal.

(2) In the connector-equipped electrical wire according to (1), the connector housing may be provided with a temporary fastening portion that maintains the first state. The first housing and the second housing are thereby easily held in position when inserting the terminal.

(3) In the connector-equipped electrical wire according to (1) or (2), the connector housing may further include a third housing mounted on a rear end side of the second housing, a third cavity may be formed in the third housing as another portion of the cavity, a portion of the terminal-equipped wire that is fitted into the third cavity may be a third portion, the first state may be a state in which the third cavity communicates with the second cavity corresponding thereto, and the second state may be a state in which the third housing is fully fastened to the first housing and the second housing, in the first state, the first portion and the second portion may respectively be configured to pass through the third cavity and fit into the first cavity and the second cavity, and the third portion may be fitted into the third cavity, in the second state, a regulatory surface of an inner surface of the third cavity may approach closer to the third portion than when in the first state, and a direction in which the regulatory surface of the second cavity approaches the second portion may differ from a direction in which the regulatory surface of the third cavity approaches the third portion. The regulatory surface of the second cavity and the regulatory surface of the third cavity can face the terminal-equipped wire from different directions to each other, and the terminal-equipped wire is thereby even less likely to vibrate.

(4) In the connector-equipped electrical wire according to (3), the second housing and the third housing may be formed in an identical shape to each other. An increase in the number of types of components constituting the connector housing can thereby be suppressed.

(5) In the connector-equipped electrical wire according to any one of (1) to (4), the second portion may include part of the terminal. The regulatory surface of the second cavity can face the portion of the terminal-equipped wire where the terminal is provided, and lengthening of the connector housing in the longitudinal direction of the wire can thereby be suppressed, compared with the case where the regulatory surface of the second cavity faces the wire of the terminal-equipped wire that extends from the terminal.

(6) In the connector-equipped electrical wire according to (5), the second portion may include a wire barrel of the terminal. The regulatory surface of the second cavity can thereby face the wire barrel. The wire barrel is sized to correspond to the crimping mold at the time of crimping to the wire, thus facilitating dimensional control thereof. Due to the regulatory surface of the second cavity facing the wire barrel, the distance between the regulatory surface of the second cavity and the wire barrel is thus easy to stably control.

(7) In the connector-equipped electrical wire according to any one of (1) to (6), the second portion may include a wire portion of the terminal-equipped wire that extends from the terminal. The regulatory surface of the second cavity can thereby face the wire portion of the terminal-equipped wire.

(8) In the connector-equipped electrical wire according to any one of (1) to (7), the regulatory surface of the second cavity may be a plurality of flat surfaces or at least one curved surface. Vibration of the terminal-equipped wire is thereby easily suppressed in a plurality of directions, compared with the case where the regulatory surface of the second cavity is one flat surface.

(9) In the connector-equipped electrical wire according to (8), a recess may be formed in the inner surface of the second cavity, in the second state, the second portion may be fitted into the recess, and a bottom surface of the recess and two side surfaces extending toward an opening of the recess from the bottom surface may be the regulatory surface of the second cavity. The regulatory surface of the second cavity can thereby face the second portion from a plurality of directions with a simple configuration.

(10) In the connector-equipped electrical wire according to any one of (1) to (9), the regulatory surface of the second cavity may be in contact with the second portion. Vibration of the terminal-equipped wire is thereby more easily suppressed.

(11) In the connector-equipped electrical wire according to any one of (1) to (9), the regulatory surface of the second cavity may be spaced from the second portion. Damage to the connector housing is thereby suppressed.

(12) In the connector-equipped electrical wire according to any one of (1) to (11), the terminal-equipped wire may further include a sealing member mounted on the terminal, and the first portion may include the sealing member. The portion of the terminal-equipped wire on the rear end side with respect to the sealing member is thereby restrained by the regulatory surface of the second cavity.

(13) Also, a connector housing of the present disclosure is a connector housing in which a cavity for insertion of a terminal-equipped electrical wire is formed, the connector housing including a first housing, and a second housing mounted on a rear end side of the first housing, a first cavity being formed in the first housing as a portion of the cavity, a second cavity being formed in the second housing as another portion of the cavity, a portion of the terminal-equipped wire that is fitted into the first cavity being a first portion and a portion of the terminal-equipped wire that is fitted into the second cavity being a second portion, the connector housing being provided with a full fastening portion that maintains a mounted state of the first housing and the second housing, in a first state before full fastening by the full fastening portion is achieved and in which the first cavity communicates with the second cavity corresponding thereto, the first portion being configured to pass through the second cavity and fit into the first cavity, and the second portion being fitted into the second cavity, and in a second state in which the second housing is fully fastened to the first housing, part of an inner surface of the second cavity may approach closer to the second portion than when in the first state. In the second state, vibration suppression of the terminal-equipped wire inside the connector housing is achieved, due to the part of the inner surface of the second cavity approaching closer to the second portion than when in the first state. It is thereby possible to suppress vibration of the terminal-equipped wire inside the connector housing without needing to provide a protrusion on the terminal.

DETAILED DESCRIPTION OF EMBODIMENTS OF DISCLOSURE

Specific examples of a connector-equipped electrical wire of the present disclosure will be described below with reference to the drawings. Note that the present disclosure is not limited to these illustrative examples and is indicated by the claims, and all changes that come within the meaning and range of equivalency of the claims are intended to be embraced therein.

First Embodiment

Figure 2:
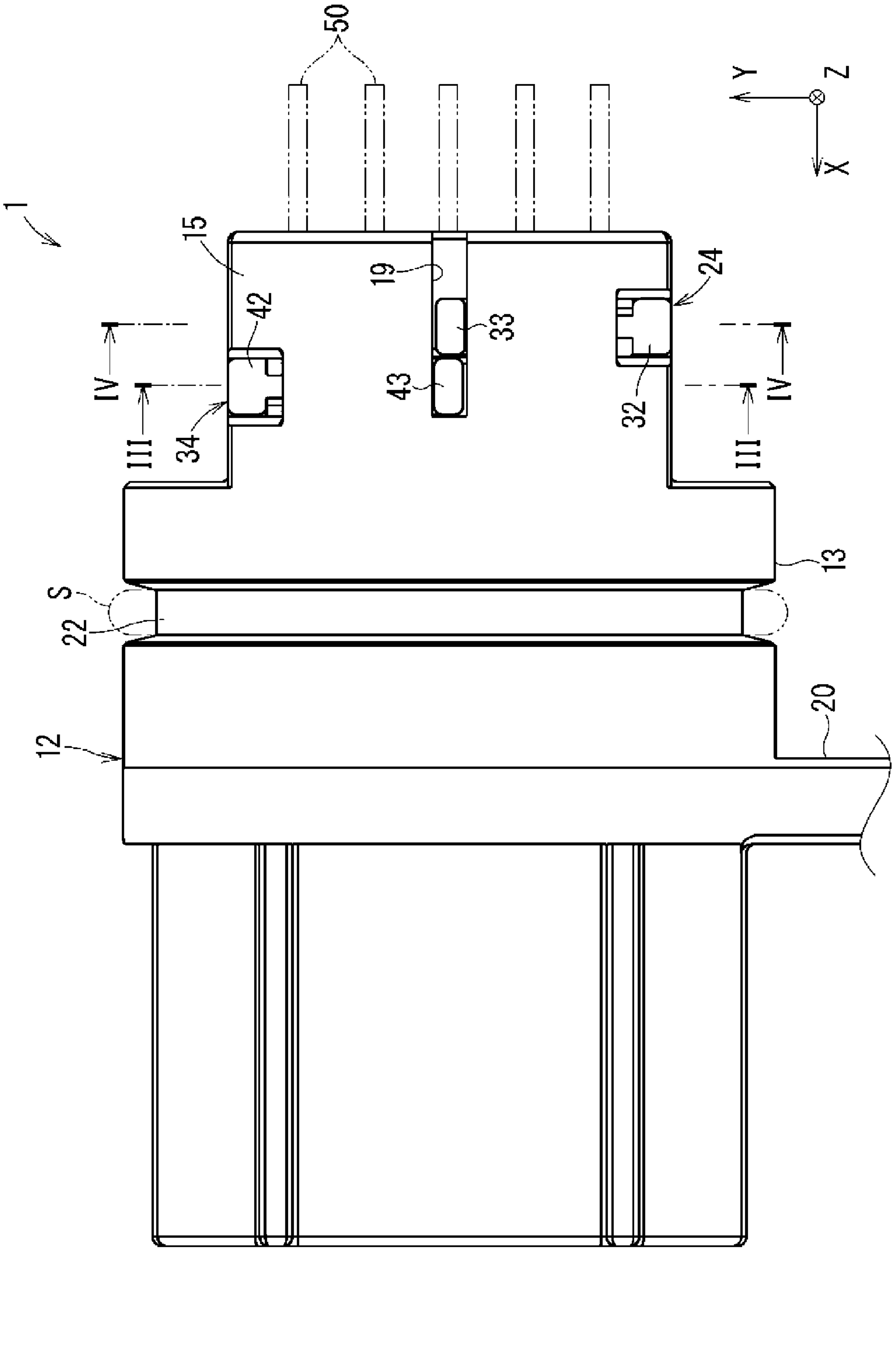
FIG. 2 is a plan view showing the connector-equipped wire according to the first embodiment.
Figure 3:
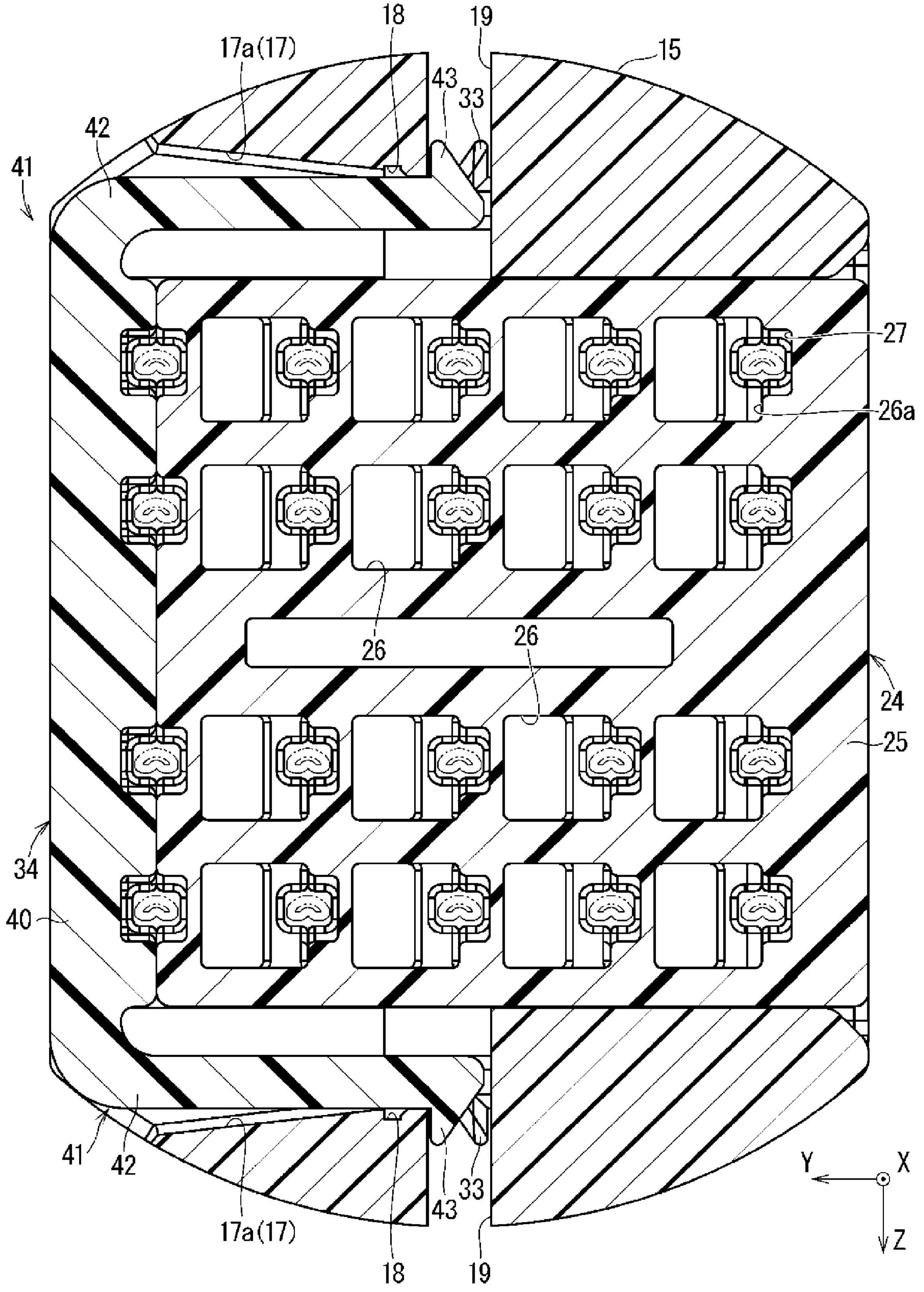
FIG. 3 is a cross-sectional view taken along line in FIG. 2.
Figure 4:
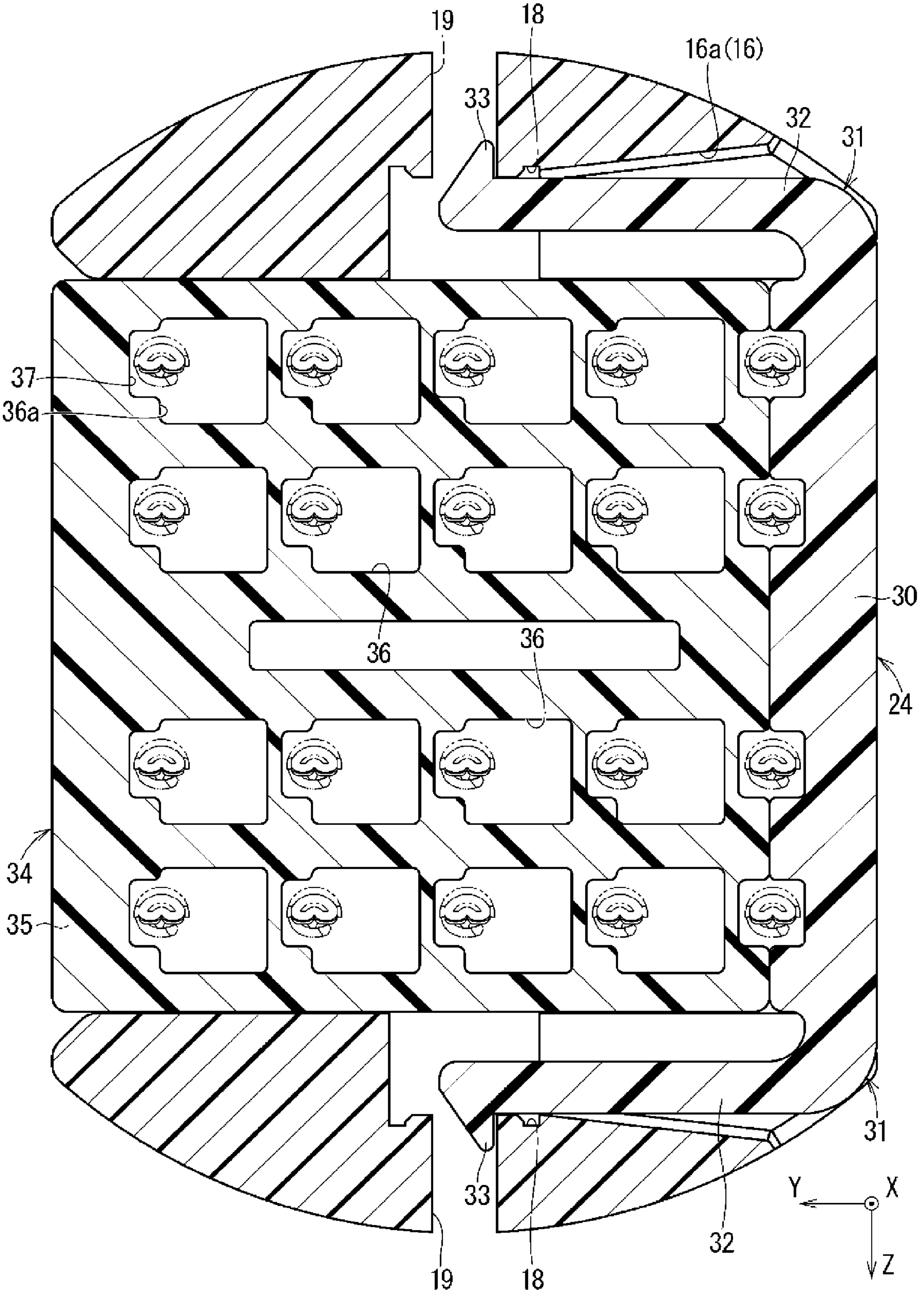
FIG. 4 is a cross-sectional view taken along line IV-IV in FIG. 2.
Figure 5:
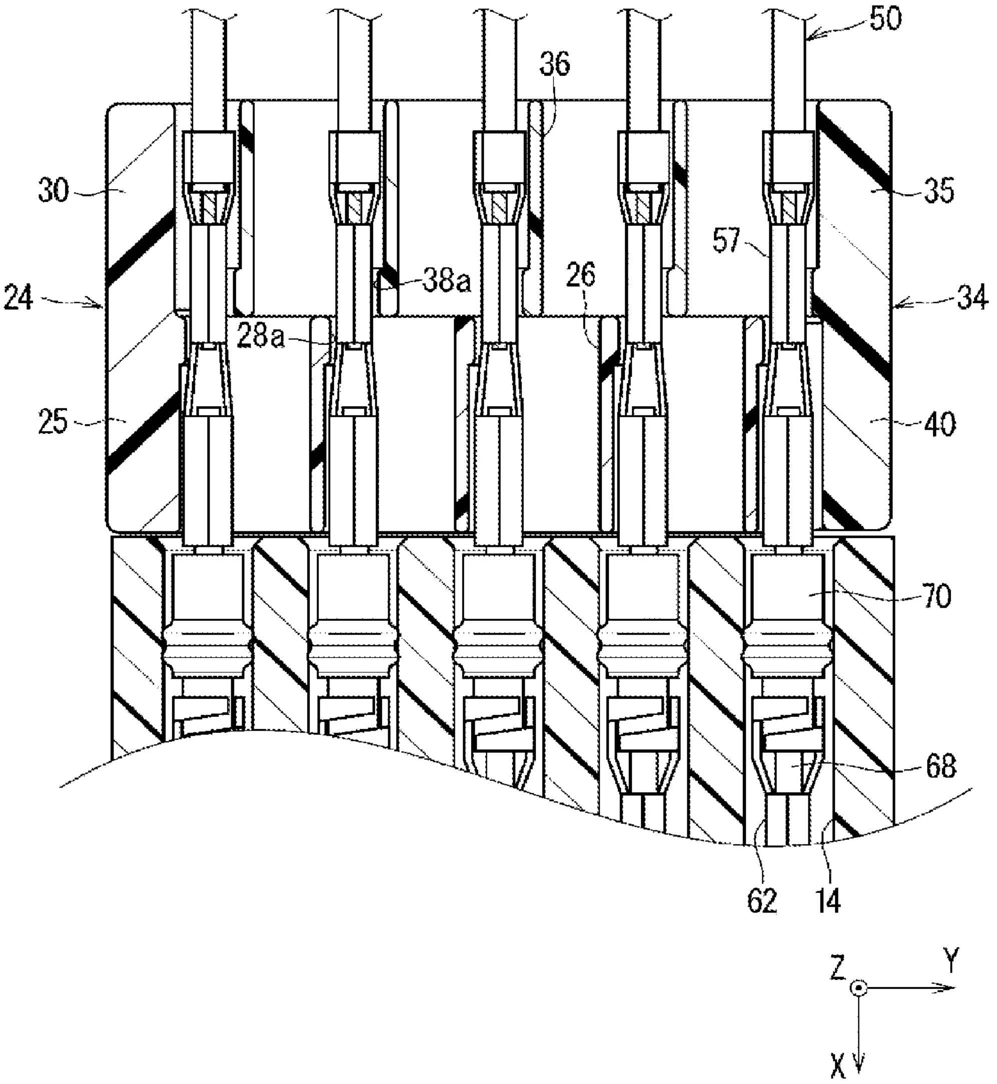
FIG. 5 is a longitudinal sectional view showing the connector-equipped wire according to the first embodiment.

Hereinafter, a connector-equipped electrical wire according to a first embodiment will be described. FIG. 1 is a perspective view showing a connector-equipped electrical wire 1 according to the first embodiment. FIG. 2 is a plan view showing the connector-equipped wire 1 according to the first embodiment. FIG. 3 is a cross-sectional view taken along line in FIG. 2. FIG. 4 is a cross-sectional view taken along line IV-IV in FIG. 2. FIG. 5 is a longitudinal sectional view showing the connector-equipped wire 1 according to the first embodiment.

The connector-equipped wire 1 is provided with a connector housing 10 and a terminal-equipped electrical wire 50. A cavity is formed in the connector housing 10. The terminal-equipped wire 50 is inserted into the cavity. Hereinafter, the axial direction of the cavity will be referred to as the X direction, and the two directions orthogonal to the axial direction of the cavity will be referred to as the Y direction and the Z direction. The terminal-equipped wire 50 is inserted through the opening of the cavity that is located on the negative side in the X direction. A plurality of cavities are formed side by side in the Y direction. A plurality of cavities are also formed side by side in the Z direction. Naturally, it is not necessary to form a plurality of cavities, and there may be one cavity. Also, in the case where a plurality of cavities are formed, the cavities need not be arranged in both the Y direction and the Z direction, and may be arranged in only one of the Y direction and the Z direction.

Connector Housing

Figure 6:
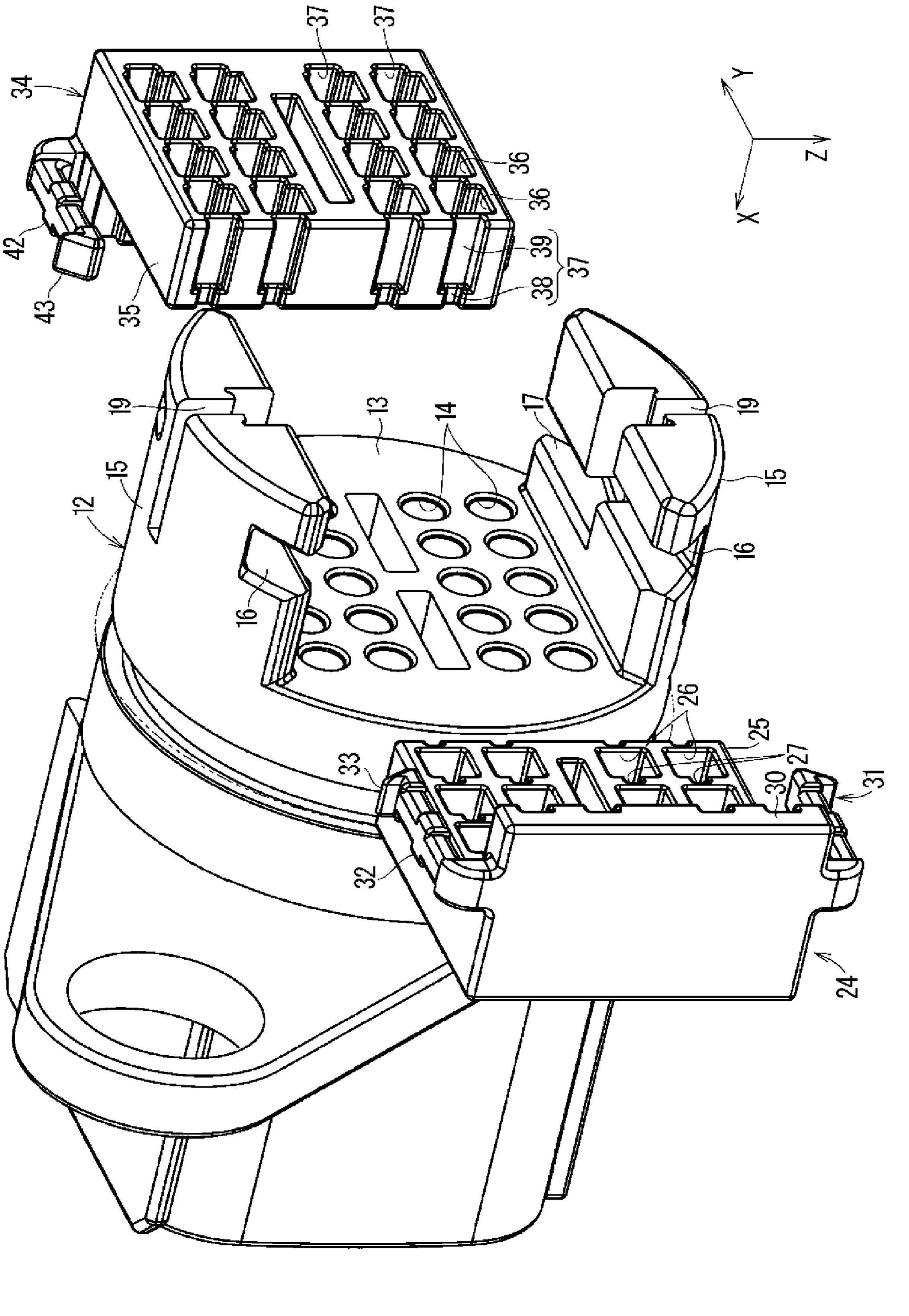
FIG. 6 is an exploded perspective view showing a connector housing according to the first embodiment.
Figure 7:
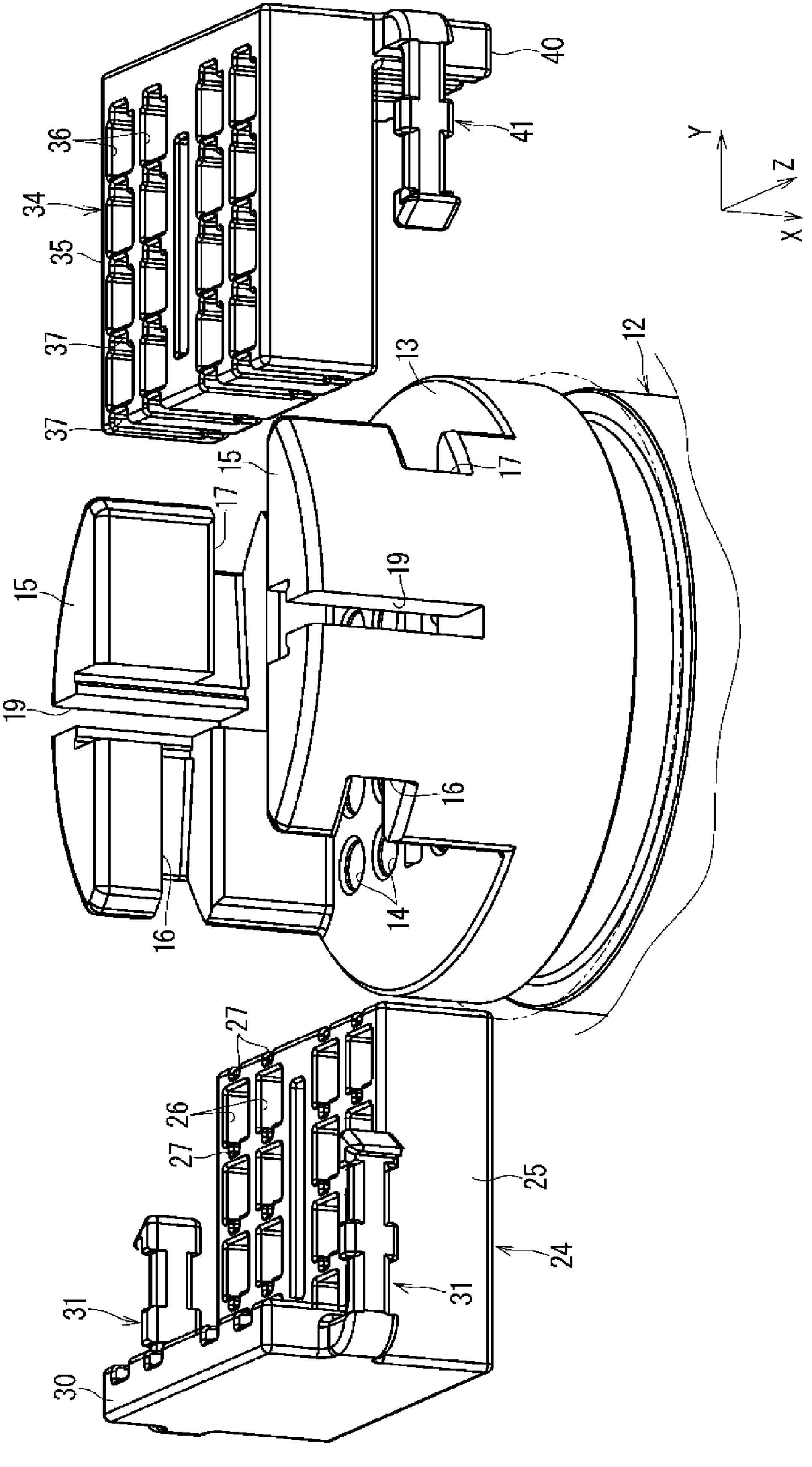
FIG. 7 is an exploded perspective view showing a connector housing according to the first embodiment.
Figure 8:
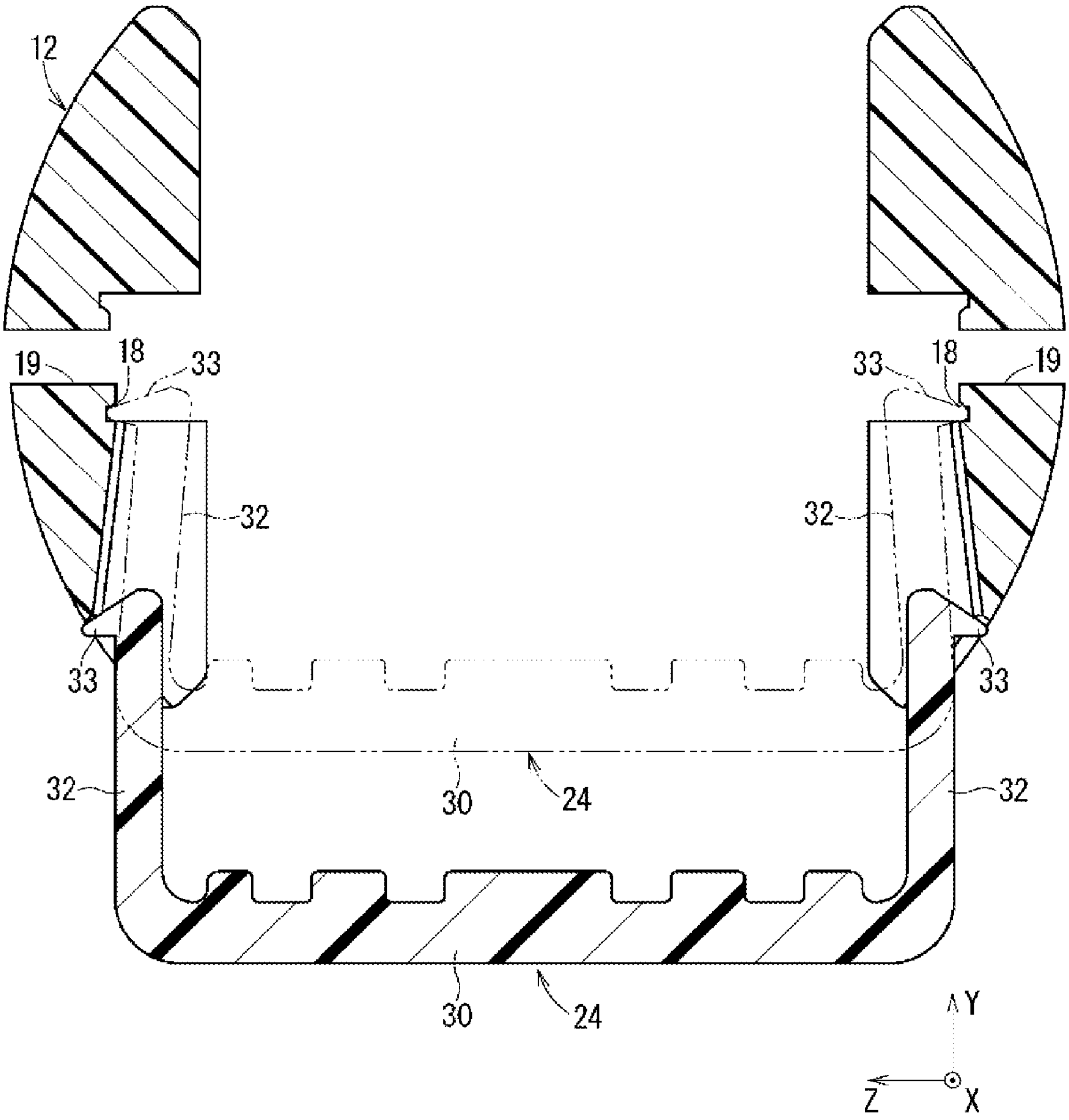
FIG. 8 is an illustrative diagram showing a first housing and a second housing temporarily fastened together.

The connector housing 10 will be described with reference to FIGS. 6 to 8 in addition to FIGS. 1 to 5. FIG. 6 is an exploded perspective view showing the connector housing 10 according to the first embodiment. FIG. 7 is an exploded perspective view showing the connector housing 10 according to the first embodiment. FIG. 7 is a view from a different direction to FIG. 6. FIG. 8 is an illustrative diagram showing a first housing 12 and a second housing 24 temporarily fastened together.

The connector housing 10 includes the first housing 12 and the second housing 24. The connector housing 10 further includes a third housing 34. A first cavity 14 is formed in the first housing 12 as a portion of one cavity. A second cavity 26 is formed in the second housing 24 as another portion of one cavity. A third cavity 36 is formed in the third housing 34 as yet another portion of one cavity. The first cavity 14, the second cavity 26 and the third cavity 36 are different portions of one cavity in the connector housing 10 that are divided in the axial direction. A portion of one terminal-equipped wire 50 is fitted into the first cavity 14, another part is fitted into the second cavity 26, and another part is fitted into the third cavity 36. In the present disclosure, the portion of the terminal-equipped wire 50 that is fitted into the first cavity 14 is a first portion, the portion that is fitted into the second cavity 26 is a second portion, and the portion that is fitted into the third cavity 36 is a third portion.

The second housing 24 is mounted on the rear end side of the first housing 12. The second cavities 26 are located on the terminal insertion opening side with respect to the first cavities 14. The third housing 34 is mounted on the rear end side of the second housing 24. The third cavities 36 are located on the terminal insertion opening side with respect to the second cavities 26. The first cavities 14, the second cavities 26 and the third cavities 36 are arranged in this order from the positive side in the X direction. Accordingly, the first portion, second portion and third portion of the terminal-equipped wires 50 are also arranged in this order from the positive side in the X direction.

Figure 11:
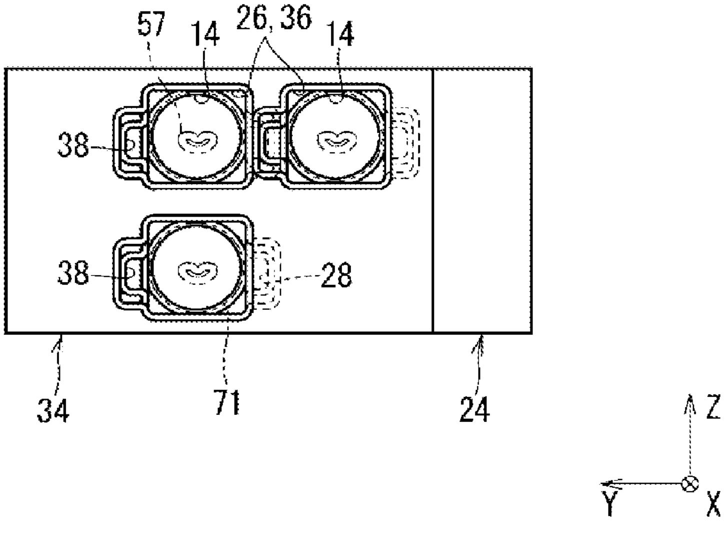
FIG. 11 is a schematic diagram showing manufacturing of the connector-equipped wire.
Figure 12:
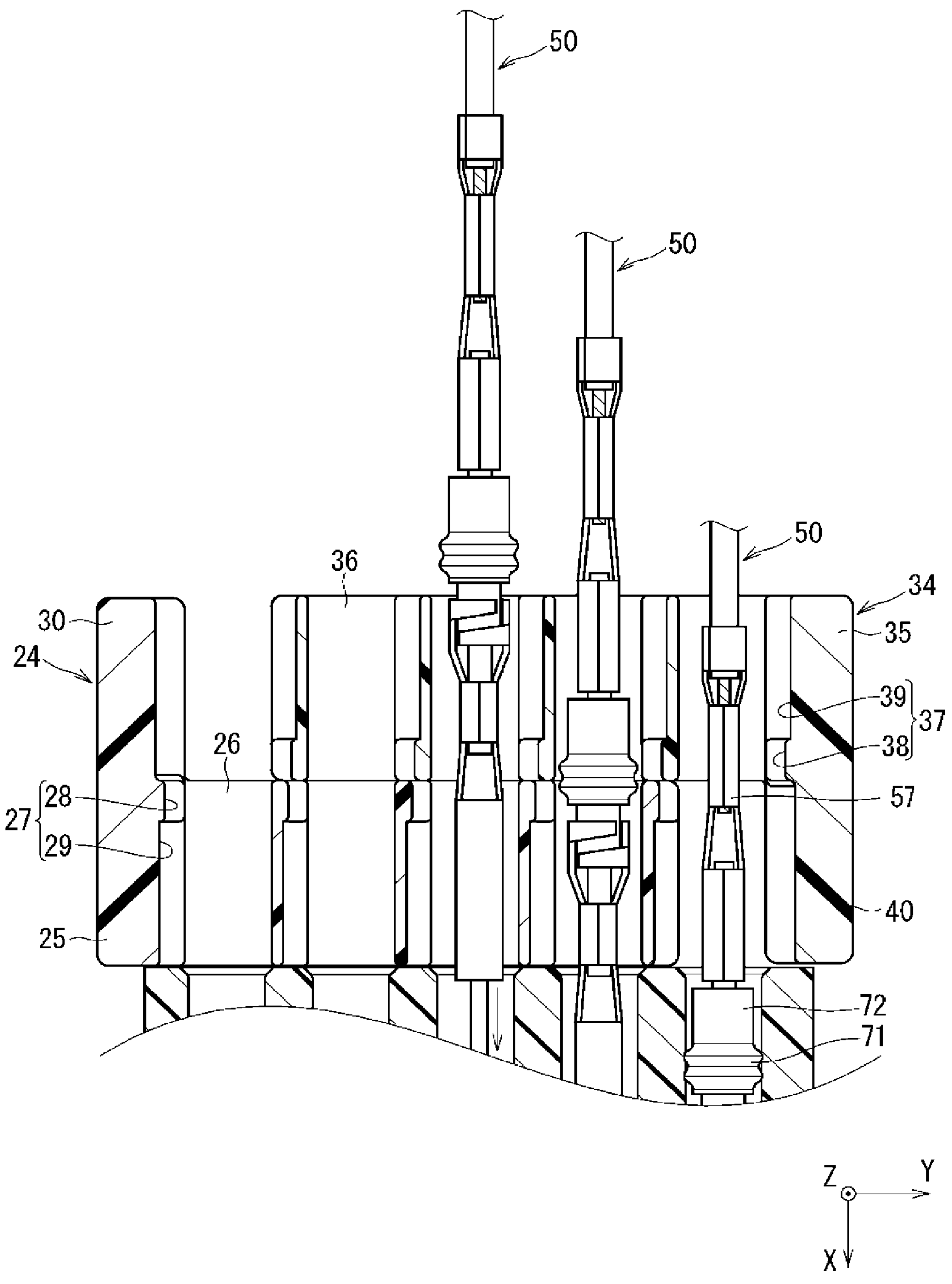
FIG. 12 is a schematic diagram showing manufacturing of the connector-equipped wire.

The connector housing 10 is provided with a full fastening portion that maintains the mounted state of the first housing 12, the second housing 24 and the third housing 34. In the present disclosure, the state before full fastening by the full fastening portion is achieved and in which corresponding first cavities 14, second cavities 26 and third cavities 36 communicate with each other is a first state. Also, the state in which full fastening by the full fastening portion is achieved is a second state. FIGS. 1 to 5 show the second state. FIGS. 6 and 7 show the state before the first state. The second housing 24 shown with solid lines in FIG. 8 is in the state before the first state, and the second housing 24 shown with imaginary lines is in the first state. The first state is also shown in FIGS. 11 and 12 described later. The second housing 24 and the third housing 34 move in opposite directions to each other in the Y direction toward the first housing 12 from the state shown in FIGS. 6 and 7, and eventually achieve the first state. From this state, the second housing 24 and the third housing 34 move in opposite directions to each other in the Y direction toward the first housing 12, and eventually achieve the second state. The connector housing 10 is provided with a temporary fastening portion that maintains the first state.

The terminal-equipped wires 50 are inserted into the cavities in the first state. At this time, the terminal-equipped wires 50 are insertable to a predetermined position in the cavities. In the first state, the first portion is configured to pass through the third cavity 36 and the second cavity 26 and fit into the first cavity 14. Also, in the first state, the second portion is configured to pass through the third cavity 36 and fit into the second cavity 26. Also, in the first state, the third portion is configured to fit into the third cavity 36.

Vibration suppression of the terminal-equipped wires 50 inside the cavities is achieved, by changing from the first state to the second state, after the terminal-equipped wires 50 are inserted into the cavities. This will be described in detail later.

The first housing 12 includes a first housing body 13 in which the first cavities 14 are formed. The first cavities 14 are formed to pass through the first housing body 13. One opening of each first cavity 14 is open in one face of the first housing body 13. The first portion of the terminal-equipped wire 50 is inserted into the first cavity 14 through this one opening. The other opening of each first cavity 14 is open in the other face of the first housing body 13. A conductor pin provided on a male terminal passes out of the other opening. In this example, the terminals of the terminal-equipped wires 50 are described as being male terminals, but the terminals of the terminal-equipped wires 50 may be female terminals. The inner surface shape of the first cavities 14 can be set as appropriate. Here, the inner surface of each first cavity 14 from the one opening to the portion where a sealing member 70 described later is fitted is formed in a circular shape. The inner diameter gradually increases toward the one opening from the portion of the first cavity 14 where the sealing member 70 is fitted. The inner diameter (diameter of inner surface) of the portion of the first cavity 14 where the sealing member 70 is fitted is D1 (see FIG. 10). The inner diameter of the one opening of the first cavity 14 is D2 (see FIG. 10). The inner diameter D2 is larger than the inner diameter D1.

The first housing body 13 is provided with two first wall parts 15 that position the second housing 24 and the third housing 34. The two first wall parts 15 protrude in the X direction from respective sides of the one face of the first housing body 13 across the first cavities 14. The two first wall parts 15 are provided at a distance from each other in the Z direction. The second housing 24 and the third housing 34 are inserted in the Y direction between the two first walls 15.

Two grooves 16 and 17 and a slit 19 are formed in each first wall part 15. The two grooves 16 and 17 are recessed in the Z direction. The two grooves 16 and 17 extend in the Y direction from the outer edge of the first wall part 15 to the slit 19. The two grooves 16 and 17 are provided at a distance from each other in the X direction. The two grooves 16 and 17 extend toward the slit 19 from the outer edges on opposite side of the first wall part 15 to each other in the Y direction. Bottom surfaces 16*a* and 17*a* of the two grooves 16 and 17 are both inclined surfaces. The grooves 16 of the two first walls 15 guide fastening pieces 31 described later of the second housing 24. The grooves 17 of the two first walls 15 guide fastening pieces 41 described later of the third housing 34. The bottom surfaces 16*a* and 17*a* are provided with a temporary fastening recess 18. The temporary fastening recesses 18 are used as temporary fastening portions. The slit 19 extends in the X direction from the end face, in the X direction, of the first wall part 15. The first wall part 15 is partially divided in the Y direction by the slit 19. The slits 19 are used as full fastening portions.

The second housing 24 includes a second housing body 25 in which the second cavities 26 are formed. The second cavities 26 are formed to pass through the second housing body 25. One opening of each second cavity 26 is open in one face of the second housing body 25. The first portion and second portion of the terminal-equipped wire 50 are inserted into the second cavity 26 through this one opening. The other opening of each second cavity 26 is open in the other face of the second housing body 25. The first portion of the terminal-equipped wire 50 extends toward the first cavity 14 from the other opening.

An inner surface 26*a* of each second cavity 26 is formed in a rectangular shape (here, square shape). A recess 27 is formed in the inner surface 26*a* of the second cavity 26. The recess 27 is formed in the surface of the inner surface 26*a* of the second cavity 26 that faces the positive side in the Y direction. The recess 27 is recessed on the negative side in the Y direction. The recess 27 can also be regarded as being provided in a partition wall part that partitions two second cavities 26 that are adjacent to each other in the Y direction. The depth dimension of the recess 27 (dimension in Y direction) is smaller than the thickness dimension of the partition wall parts in the second housing body 25. The width dimension (dimension in Z direction) of the recess 27 is smaller than the dimension in the Z direction of the inner surface (one side of square) on the opposite side to the inner surface 26*a* in which the recess 27 is formed. The center of the recess 27 in the Z direction is displaced to the negative side in the Z direction with respect to the center of the second cavity 26 (center of square). The recess 27 is formed in a shape having a bottom surface and two side surfaces that extend toward the opening from the bottom surface. The recess 27 is provided contiguously in the X direction from one opening to the other opening of the second cavity 26. A portion of the recess 27 in the X direction is formed smaller than other portions thereof in the X direction. The smaller portion of the recess 27 is a small recess 28, and the larger portion is a large recess 29. In the second cavity 26, the large recess 29 is located on the first cavity 14 side in the X direction with respect to the small recess 28. The width dimension (dimension in Z direction) of the small recess 28 is smaller than the width dimension of the large recess 29. The depth dimension (dimension in Y direction) of the small recess 28 is smaller than the depth dimension of the large recess 29. The second portion is fitted into the recess 27 in the second state.

The second housing body 25 is provided with a second wall part 30. The second wall part 30 protrudes in the X direction from the second housing body 25. The second wall part 30 partially protrudes from an outer edge portion, in the Y direction, of the second housing body 25. With the first housing 12, the second housing 24 and the third housing 34 fully fastened, the second wall part 30 positions the third housing 34 in the Y direction.

The second housing body 25 is provided with two fastening pieces 31. The fastening pieces 31 are used for both temporary fastening and full fastening. Each fastening piece 31 has a support piece 32 and a fastening protrusion 33. The support piece 32 protrudes in an L-shape from the side surface of the second wall part 30. The fastening protrusion 33 is provided on a distal end portion of the support piece 32. The fastening protrusion 33 protrudes in the Z direction from the distal end portion of the support piece 32. When the second housing 24 is inserted between the first wall parts 15, the fastening protrusions 33 come into contact with the bottom surfaces 16*a* of the grooves 16 and are subjected to an external force that acts in the Z direction. The support pieces 32 can elastically deform such that the spacing between the distal end portions of the two fastening pieces 31 narrows under the external force acting in the Z direction. The second housing 24 can thereby enter between the first wall parts 15. Then, when the fastening protrusions 33 reach the position of the temporary fastening recesses 18, the first housing 12 and the second housing 24 are temporarily fastened, due to the support pieces 32 elastically returning and the fastening protrusions 33 catching in the temporary fastening recesses 18. Also, the first housing 12 and the second housing 24 are fully fastened, due to the fastening protrusions 33 catching in the slits 19.

The third housing 34 includes a third housing body 35 in which the third cavities 36 are formed. The third cavities 36 are formed to pass through the third housing body 35. One opening of each third cavity 36 is open in one face of the third housing body 35. The first portion, second portion and third portion of the terminal-equipped wire 50 are inserted into the third cavity 36 through this one opening. The other opening of each third cavity 36 is open in the other face of the third housing body 35. The first portion and second portion of the terminal-equipped wire 50 extend toward the first cavity 14 and the second cavity 26 from the other opening.

An inner surface **36*a* of each third cavity 36 is formed in a rectangular shape (here, square shape). A recess 37 is formed in the inner surface 36*a* of the third cavity 36. The recess 37 is formed in the surface of the inner surface 36*a* of the third cavity 36 that faces the negative side in the Y direction. The recess 37 is recessed on the positive side in the Y direction. The recess 37 can also be regarded as being provided in a partition wall part that partitions two third cavities 36 that are adjacent to each other in the Y direction. The depth dimension of the recess 37 (dimension in Y direction) is smaller than the thickness dimension of the partition wall parts in the third housing body 35. The width dimension (dimension in Z direction) of the recess 37 is smaller than the dimension in the Z direction of the inner surface (one side of square) on the opposite side to the inner surface 36*a* in which the recess 37 is formed. The center of the recess 37 in the Z direction is displaced to the negative side in the Z direction with respect to the center of the third cavity 36 (center of square). The recess 37 is formed in a shape having a bottom surface and two side surfaces that extend toward the opening from the bottom surface. The recess 37 is provided contiguously in the X direction from one opening to the other opening of the third cavity 36. A portion of the recess 37 in the X direction is formed smaller than other portions thereof in the X direction. The smaller portion of the recess 37 in the X direction is a small recess 38, and the larger portion is a large recess 39. In the third cavity 36, the small recess 38 is located on the first cavity 14 side in the X direction with respect to the large recess 39. The width dimension (dimension in Z direction) of the small recess 38 is smaller than the width dimension of the large recess 39. The depth dimension (dimension in Y direction) of the small recess 38 is smaller than the depth dimension of the large recess 39. The third portion is fitted into the recess 37** in the second state.

The third housing body 35 is provided with a third wall part 40. The third wall part 40 protrudes in the X direction from the third housing body 35. The third wall part 40 partially protrudes from an outer edge portion, in the Y direction, of the third housing body 35. With the first housing 12, the second housing 24 and the third housing 34 fully fastened, the third wall part 40 positions the second housing 24 in the Y direction.

The third housing body 35 is provided with two fastening pieces 41. The fastening pieces 41 are used for both temporary fastening and full fastening. Each fastening piece 41 has a support piece 42 and a fastening protrusion 43. The support piece 42 protrudes in an L-shape from a side surface of the third wall part 40. The fastening protrusion 43 is provided on a distal end portion of the support piece 42. The fastening protrusion 43 protrudes in the Z direction from the distal end portion of the support piece 42. When the third housing 34 is inserted between the first wall parts 15, the fastening protrusions 43 come into contact with the bottom surfaces **17*a* of the grooves 17 and are subjected to an external force that acts in the Z direction. The support pieces 42 can elastically deform such that the spacing between the distal end portions of the two fastening pieces 41 narrows under the external force acting in the Z direction. The third housing 34 can thereby enter between the first wall parts 15. Then, when the fastening protrusions 43 reach the position of the temporary fastening recesses 18, the first housing 12 and the third housing 34 are temporarily fastened, due to the support pieces 42 elastically returning and the fastening protrusions 43 catching in the temporary fastening recesses 18. Also, the first housing 12 and the third housing 34 are fully fastened, due to the fastening protrusions 43 catching in the slits 19**.

Here, the number of second cavities 26 is less than the number of first cavities 14. The second cavities 26 do not include cavities corresponding to the column of four first cavities 14 that is located furthest on the positive side in the Y direction, among of the first cavities 14. The second portions of the terminal-equipped wires 50 that are inserted into these four first cavities 14 are instead protected by the second housing body 25 and the third wall part 40. Similarly, the number of third cavities 36 is less than the number of first cavities 14. The third cavities 36 do not include cavities corresponding to the column of four first cavities 14 located furthest on the negative side in the Y direction, among of the first cavities 14. The third portions of the terminal-equipped wires 50 that are inserted into these four first cavities 14 are instead protected by the third housing body 35 and the second wall part 30.

Specifically, recesses similar to the above-described recesses 27 are formed in the surface of the outer surface of the second housing body 25 that faces toward the insertion direction (positive Y direction). Recesses similar to the above-described large recesses 39 are formed in the surface of the outer surface of the second wall part 30 that faces toward the insertion direction (positive Y direction). Recesses 37 similar to the above-described recesses 37 are formed on the surface of the outer surface of the third housing body 35 that faces toward the insertion direction (negative Y direction). Recesses similar to the above-described large recesses 29 are formed on the surface of the outer surface of the third wall part 40 that face toward the insertion direction (negative Y direction). The second portions of some of the terminal-equipped wires 50 (here, terminal-equipped wires 50 located furthest on positive side in Y direction) are enclosed, by the inner surfaces of the recesses provided on the outer surface of the second housing body 25 and the inner surfaces of the recesses provided on the third wall part 40. The third portions of some of the terminal-equipped wires 50 (here, the terminal-equipped wires 50 located furthest on negative side in Y direction) are enclosed, by the inner surfaces of the recesses provided on the outer surfaces of the third housing body 35 and the inner surfaces of the recesses provided on the second wall part 30.

The second housing 24 and the third housing 34 are formed in an identical shape to each other. The posture of the second housing 24 and the posture of the third housing 34 are different with respect to the first housing 12. The posture of the second housing 24 and the posture of the third housing 34 with respect to the first housing 12 are postures rotated 180 degrees to each other about an axis extending in the Z direction.

The connector housing 10 is provided with a vehicle attachment part 20. Here, the vehicle attachment part 20 is provided to protrude outward from the side surface of the first housing body 13. The vehicle attachment part 20 is for attaching the connector housing 10 to a vehicle. A mounting hole 21 is formed in the vehicle attachment part 20. The vehicle attachment part 20 is attached to a vehicle by a bolt or the like being inserted into the mounting hole 21. A metal ring or the like may also be provided in the mounting hole 21. The vehicle attachment part 20 may also be omitted from the connector housing 10.

Also, the connector housing 10 is provided with a sealing member mounting part 22. The sealing member mounting part 22 is provided such that a portion of the side surface of the first housing body 13 is recessed in an annular shape. The sealing member mounting unit 22 is provided on one side of the vehicle attachment part 20. A sealing member S such as an O-ring is mounted in the sealing member mounting part 22. The sealing member mounting part 22 may also be omitted from the connector housing 10.

The first housing 12, the second housing 24 and the third housing 34 are formed with a resin having insulating properties or the like as the material. The first housing 12, the second housing 24 and the third housing 34 are, for example, injection molded articles. The first housing 12, the second housing 24 and the third housing 34 are molded separately to each other.

Terminal-Equipped Electrical Wire

Figure 9:
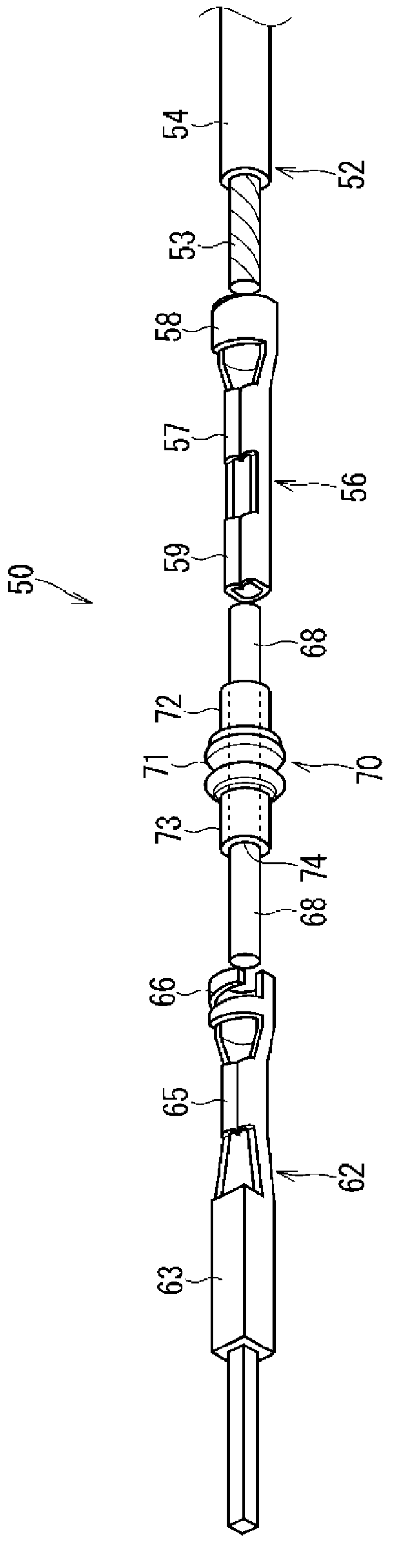
FIG. 9 is an exploded perspective view showing a terminal-equipped electrical wire.

The terminal-equipped wire 50 will be described with reference to FIG. 9 in addition to FIGS. 1 to 5. FIG. 9 is an exploded perspective view showing the terminal-equipped wire 50.

The terminal-equipped wire 50 includes a coated wire 52 and a terminal. The terminal is connected to an end portion of the coated wire 52. The terminal is a member that electrically connects the coated wire 52 to a conductor on the mating side. In this example, a joint terminal 56, a connector terminal 62 and a relay conductor 68 are provided as the terminal. The joint terminal 56 is provided on an end portion of the coated wire 52. The connector terminal 62 and the relay conductor 68 are provided on a distal end side of the joint terminal 56. The relay conductor 68 is connected to both the joint terminal 56 and the connector terminal 62. The joint terminal 56 and the connector terminal 62 are connected to each other via the relay conductor 68. The portion of the coated wire 52 that is connected to the joint terminal 56 and the portion that extends to one end side therefrom are fitted into the cavity. The portion of the coated wire 52 that is on the other end side with respect to the portion that is connected to the joint terminal 56 extends outward of the cavity from the one opening. The terminal-equipped wire 50 further includes the sealing member 70.

The coated wire 52 has a conductor core wire 53 and an insulation coating 54. Here, the conductor core wire 53 is a twisted wire. The twisted wire is formed by twisting a plurality of wire strands. These wire strands are formed with a conductor such as copper, copper alloy, aluminum or aluminum alloy as the material. The insulation coating 54 covers the conductor core wire 53. The insulation coating 54 is formed by extrusion molding a resin material around the conductor core wire 53 or by applying an insulation coating material. A distal end of the conductor core wire 53 protrudes outward from the insulation coating 54 and forms an exposed core wire portion.

The joint terminal 56 is connected by crimping to the coated wire 52 and the relay conductor 68. The joint terminal 56 includes wire barrels 57 and 59 and an insulation barrel 58. The wire barrels 57 and 59 and the insulation barrel 58 are open barrels. The wire barrels 57 and 59 and the insulation barrel 58 each have a pair of crimping pieces. The three pairs of crimping pieces are joined to a bottom portion of the joint terminal 56.

The bottom portion is formed in a flat plate shape or a semi-tubular shape. The bottom portion is formed to be elongated. The longitudinal direction of the bottom portion is the longitudinal direction of the joint terminal 56. The three pairs of crimping pieces are arranged one by one in order from one end side to the other end side in the longitudinal direction of the bottom portion. The two crimping pieces constituting each pair protrude from respective sides of the bottom portion in the width direction. The width direction of the bottom portion is the width direction of the joint terminal 56. The three pairs of crimping pieces protrude on one side with respect to the bottom portion. The direction in which the crimping pieces protrude from the bottom portion is the height direction of the joint terminal 56. This joint terminal 56 is formed by bending a conductor plate, for example.

The wire barrel 57 is crimped to the exposed core wire portion at the end portion of the conductor core wire 53. The wire barrel 59 is crimped to the relay conductor 68. The insulation barrel 58 is crimped to the insulation coating 54. The wire barrel 57 and the insulation barrel 58 are wire connection parts. The wire barrel 59 is a relay conductor connection part. The portion where the insulation barrel 58 is crimped to the insulation coating 54 is a coating holding part. The insulation barrel 58 may be omitted.

The connector terminal 62 includes a mating-side connection part 63 and a relay conductor connection part. As described above, the mating-side connection part 63 is formed in the shape of a male terminal. The mating-side connection part 63 may also be formed in the shape of a female terminal. The connector terminal 62 is connected by crimping to the relay conductor 68. The connector terminal 62 is formed by bending a conductor plate, for example. Naturally, the connector terminal 62 may also be connected to the relay conductor 68 by welding, pressure welding, or the like.

The mating-side connection part 63 has a box part formed in a box shape and a conductor pin. The conductor pin protrudes from a distal end face of the box part. The distal end portion of the conductor pin protrudes out from the cavity. The conductor pin is inserted into a female terminal on the mating side. A spring contact part or the like is provided as appropriate inside the female terminal on the mating side. The conductor pin is connected to the spring contact part or the like inside the female terminal on the mating side.

The relay conductor connection part has a wire barrel 65 and an insulation barrel 66. The wire barrel 65 is crimped to the relay conductor 68. The insulation barrel 66 is crimped to the sealing member 70. The insulation barrel 66 may be omitted from the relay conductor connection part.

The relay conductor 68 is formed as one single core conductor. The relay conductor 68 is formed in a columnar rod shape. The relay conductor 68 may also be formed in a cylindrical rod shape. The relay conductor 68 is provided to be longer than the sealing member 70. Both end portions of the relay conductor 68 in the longitudinal direction protrude outward of the sealing member 70. Respective end portions of the relay conductor 68 are crimped by the wire barrels 59 and 65. The sealing member 70 is mounted on an intermediate portion of the relay conductor 68 in the longitudinal direction.

The sealing member 70 has a sealing body 71 and protruding parts 72 and 73. A through hole 74 is formed in the sealing member 70. The relay conductor 68 is passed through the through hole 74. The sealing body 71 and the protruding parts 72 and 73 are arranged in the axial direction of the through hole 74. Here, the protruding part 72 is provided on one side of the seal main body 71, and the protruding part 73 is provided on the other side. One or both of the protruding parts 72 and 73 may be omitted.

The sealing body 71 is for stopping liquid passing between the openings of the cavity with the terminal-equipped wire 50 inserted into the cavity. An annular recessed portion and an annular raised portion are alternately connected in the longitudinal direction on the outer surface of the sealing body 71. The sealing body 71 is located between the joint terminal 56 and the connector terminal 62 in the longitudinal direction. The annular raised portions of the sealing body 71 protrude on the outer side in the radial direction relative to the joint terminal 56 and the connector terminal 62. Prior to the terminal-equipped wire 50 being inserted into the cavity, the outer diameter of the sealing body 71 (outer diameter of annular raised portions) is D3 (see FIG. 10). The outer diameter D3 of the sealing body 71 is set to be the same as or larger than an inner diameter D1 of the first cavity 14 at a predetermined sealing position. With the terminal-equipped wire 50 inserted into the first cavity 14, the outer surface of the sealing body 71 is in intimate contact with the inner surface of the first cavity 14. Here, the outer diameter D3 of the sealing body 71 is set to be larger than the inner diameter D1 of the first cavity 14, and the sealing body 71 is fitted into the first cavity 14 in a compressed state. Also, the outer diameter D3 of the sealing body 71 is set to be the same as or smaller than an inner diameter D2 of the one opening of the first cavity 14 (here, set to be smaller than inner diameter D2). The sealing body 71, when inserted toward the inside through the one opening of the first cavity 14, can thereby pass along an inclined surface, and thus the outer diameter D3 of the sealing body 71 can be suitably compressed to the inner diameter D1.

The protruding part 73, which is one of the two protruding parts 72 and 73, is crimped by the insulation barrel 66 while covering the relay conductor 68. The protruding part 73 is thereby held in position by the connector terminal 62, and the sealing member 70 is held in position in the terminal-equipped wire 50. The joint terminal 56 may also be provided with an insulation barrel for crimping onto the protruding part 72. In addition to the protruding part 72 not being crimped and held by an insulation barrel of the joint terminal 56, the protruding part 73 may also not be crimped and held by the insulation barrel 66 of the connector terminal 62. The sealing member 70 may be held in position by being sandwiched between the joint terminal 56 and the connector terminal 62 in the X direction. Also, the relay conductor 68 may be formed in a shape capable of holding the sealing member 70 in position. For example, an annular groove may be formed in the relay conductor 68. The sealing member 70 is held in position by the relay conductor 68 due to the sealing member 70 being fitted into the annular groove.

With the terminal-equipped wire 50 housed in the cavity, liquid is stopped from passing between the openings of the first cavity 14 due to the sealing member 70 being provided. Ingress of water or the like from the other opening of the cavity (other opening of first cavity 14) in the connector housing 10 to the one opening thereof (one opening of third cavity 36) is thereby suppressed. The sealing member 70 is envisaged as stopping liquid such as water, oil and the like. The oil is, for example, oil (hydraulic oil) for performing control operations of automatic shifting in an automatic transmission. Liquid is stopped from passing between the openings of the cavity in the following manner, for example.

The inside of the relay conductor 68 is solidly formed. Infiltration of liquid from one of the openings on both sides of the first cavity 14 to the other opening through the inside of the relay conductor 68 is thereby suppressed. The inside of the relay conductor 68 may also be hollow. Even in this case, if at least one side of the relay conductor 68 in the longitudinal direction is blocked, infiltration of liquid from one of the openings on both sides of the first cavity 14 to the other opening through the inside of the relay conductor 68 is suppressed.

The inner surface of the sealing body 71 (inner peripheral surface of the through hole 74) is circular in shape. The inner surface of the sealing body 71 is in intimate contact with the entire outer surface of the relay conductor 68 in the circumferential direction. Infiltration of liquid from one of the openings on both sides of the first cavity 14 to the other opening by passing between the sealing body 71 and the relay conductor 68 is thereby suppressed. Note that the inner surface of at least a portion of the sealing body 71 in the longitudinal direction need only be in intimate contact with the outer surface of the relay conductor 68 around the entire circumference. The inner surface of the sealing body 71 prior to being mounted on the relay conductor 68 may be formed to be smaller than the outer surface of the relay conductor 68. With the terminal-equipped wire 50 housed in the cavity, the inner surface of the sealing body 71 may also be pressed against the outer surface of the relay conductor 68 by pressure applied by the first cavity 14.

The outer surface at the annular raised portions of the sealing body 71 is circular in shape. The outer surface of the annular raised portions of the sealing body 71 is in intimate contact around the entire circumference with the inner surface of the first cavity 14 at the sealing position. Infiltration of liquid from one of the openings on both sides of the first cavity 14 to the other opening by passing between the sealing body 71 and the first housing body 13 is thereby suppressed.

As described above, the portion of the terminal-equipped wire 50 that is fitted into the first cavity 14 is the first portion, the portion that is fitted into the second cavity 26 is the second portion, and the portion that is fitted into the third cavity 36 is the third portion. The first portion includes the mating-side connection part 63. The first portion includes the entire connector terminal 62 excluding the conductor pin portion. Also, the first portion includes the sealing member 70. The first portion favorably includes at least the sealing body 71 of the sealing member 70. The second portion includes part of the terminal. Here, the second portion includes the wire barrel 57 and the front end portion of the joint terminal 56 therefrom. The third portion includes the wire barrel 57 and the rear end portion of the joint terminal 56 therefrom. An intermediate portion of the wire barrel 57 in the X direction is a boundary portion between the second portion and the third portion.

When the portions (first portion, second portion and third portion) of the terminal-equipped wire 50 that are housed in the connector housing 10 are observed from the X direction, the annular raised portions of the sealing body 71 are on the outermost periphery, In the first state, these annular raised portions of the sealing body 71 are configured to pass through the cavity of the connector housing 10 from the one opening to a predetermined position.

Manufacturing Process

Figure 10:
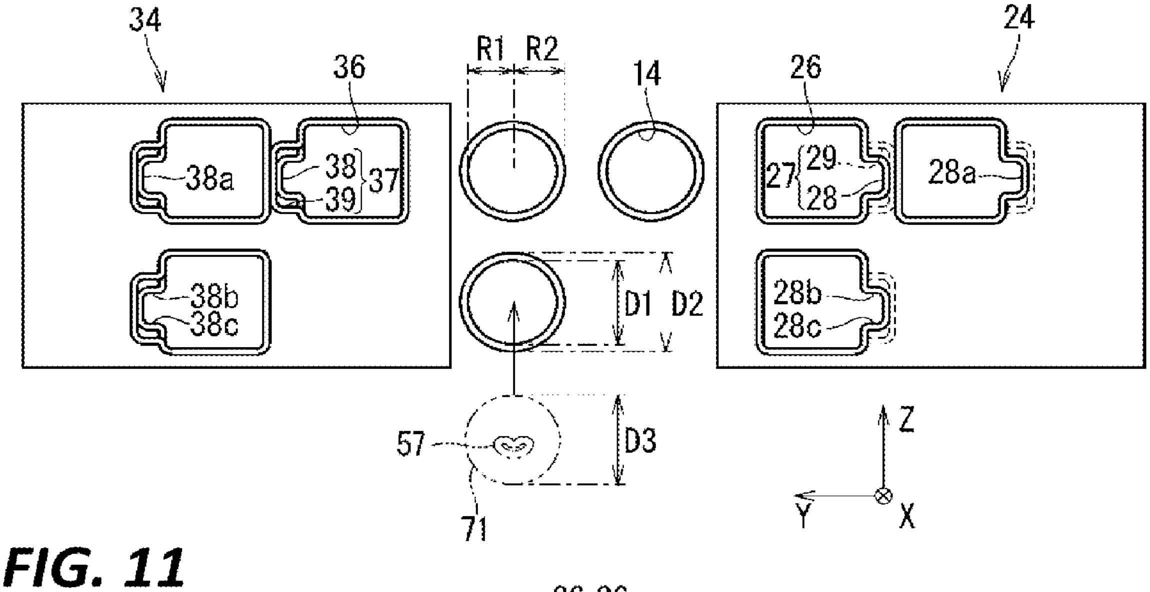
FIG. 10 is a schematic diagram showing manufacturing of the connector-equipped wire.
Figure 13:
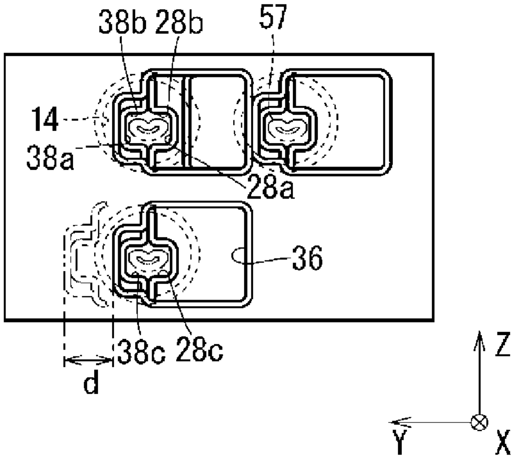
FIG. 13 is a schematic diagram showing manufacturing of the connector-equipped wire.

FIGS. 10 to 13 are schematic diagrams showing manufacturing of the connector-equipped wire 1. In FIGS. 10, 11 and 13, three of the plurality of cavities in the connector housing 10 are illustrated for ease of understanding. Two of the three cavities are side by side in the Y direction, and the remaining cavity is side by side one of these two cavities in the Z direction.

In manufacturing the connector-equipped wire 1, the connector housing 10 and the terminal-equipped wires 50 are prepared. After being separately molded, the first housing 12, the second housing 24 and the third housing 34 are held in the connector housing 10 in an insertion posture in which the terminal-equipped wires 50 can be inserted. FIG. 10, similarly to FIG. 6 or FIG. 7, shows the second housing 24 and the third housing 34 before being attached to the first housing 12, and does not show the insertion posture. FIGS. 11 and 12 show the insertion posture in which the terminal-equipped wires 50 can be inserted. In this insertion posture, the corresponding first cavities 14, second cavities 26 and third cavities 36 communicate with each other. From the state of FIG. 6, 7 or 10, the second housing 24 and the third housing 34 move in the Y direction and are partially inserted into the first housing 12 to achieve the insertion posture. Here, the first housing 12, the second housing 24 and the third housing 34 are held in the insertion posture, by the temporary fastening portions of the first housing 12 and the second housing 24 being temporarily fastened, and the temporary fastening portions of the first housing 12 and the third housing 34 being temporarily fastened, as shown by the imaginary lines in FIG. 8.

The terminal-equipped wires 50 are inserted into the cavities of the connector housing 10, with the first housing 12, the second housing 24 and the third housing 34 in the insertion posture. Here, the terminal-equipped wires 50 are inserted into the cavities through the one opening of the third cavities 36. Also, the terminal-equipped wires 50 are inserted into the cavities from the mating-side connection part 63 side. FIG. 12 shows three terminal-equipped wires 50 inserted to differing degrees. In FIG. 12, the degree of insertion increases sequentially from the leftmost terminal-equipped wire 50 toward the rightmost terminal-equipped wire 50. In FIG. 12, the terminal-equipped wire 50 in the middle is in a state where the sealing body 71 is passing through the positions of the small recesses 28 and 38. In FIG. 12, insertion of the terminal-equipped wire 50 on the rightmost side to the predetermined position has been completed.

When all the terminal-equipped wires 50 have been inserted to the predetermined position in a similar manner to the rightmost terminal-equipped wire 50 in FIG. 12, the full fastening portions of the first housing 12, the second housing 24 and the third housing 34 are fully fastened to achieve the second state. Here, the second housing 24 and the third housing 34 are moved in the Y direction with respect to the first housing 12, and the fastening protrusions 33 and 43 disengage from the temporary fastening recesses 18 and are fastened onto the inner surfaces of the slits 19. The second housing 24 and the third housing 34 moving backward in the insertion direction and coming out of the first housing 12 is thereby suppressed. Also, in the case where a force acting forward in the insertion direction is applied to the second housing 24, the second housing 24 moving forward in the insertion direction and coming out of the first housing 12 is suppressed, due to the second housing body 25 and the third wall part 40 coming into contact with each other. Similarly, in the case where a force acting forward in the insertion direction is applied to the third housing 34, the third housing 34 moving forward in the insertion direction and coming out of the first housing 12 is suppressed, due to the third housing body 35 and the second wall part 30 coming into contact with each other.

In the second state, part of the second portion (one side of terminal-equipped wire 50 in Y direction) is fitted into the recess 27. The bottom surface and two side surfaces of the recess 27 are respectively regulatory surfaces **28*a*, 28*b* and 28*c* of the second cavity 26. In the second state, part of the third portion (other side of terminal-equipped wire 50 in Y direction) is fitted into the recess 37. The bottom surface and two side surfaces of the recess 37 are respectively regulatory surfaces 38*a*, 38*b* and 38*c* of the third cavity 36. In the second state, the side surface of the terminal-equipped wire 50 is covered by the regulatory surfaces 28*a* and 38*a* facing in the Y direction. Apart from the regulatory surfaces 28*a* and 38*a*, the terminal-equipped wire 50 is also regulated by the regulatory surfaces 28*b*, 28*c*, 38*b* and 38*c* facing in the Z direction. The upper surface of the terminal-equipped wire 50 is covered by the regulatory surfaces 28*b* and 38*b*, and the lower surface thereof is covered by the regulatory surfaces 28*c* and 38*c*. The regulatory surfaces 28*a*, 28*b* and 28*c* of the second cavity 26 are a plurality of flat surfaces. The regulatory surfaces 38*a*, 38*b* and 38*c* of the third cavities 36 are also a plurality of flat surfaces. The small recess 28 may also be formed in a semi-cylindrical shape, and the regulatory surfaces of the second cavity 26 may be at least one curved surface. This similarly applies to the regulatory surfaces of the third cavity 36**.

When observed from the X direction, in the second state, the regulatory surfaces **28*a*, 28*b* and 28*c* of the inner surface 26*a* of the second cavity 26 approach closer to the second portion than when in the first state. Also, in the second state, the regulatory surfaces 38*a*, 38*b* and 38*c* of the inner surface 36*a* of the third cavity 36 approach closer to the third portion than when in the first state. The direction in which the regulatory surfaces 28*a*, 28*b* and 28*c* of the second cavity 26 approach the second portion is different from the direction in which the regulatory surfaces 38*a*, 38*b* and 38*c* of the third cavity 36** approach the third portion.

A dimension R1 shown in FIG. 10 is a radius R1 of the portion of the first cavity 14 into which the sealing member 70 is fitted. A dimension R2 shown in FIG. 10 is a radius R2 of the opening of the first cavity 14 on the side into which the terminal-equipped wire 50 is inserted. A dimension d shown in FIG. 13 is a distance d that the second housing 24 moves with respect to the first housing 12 from the first state to the second state. Here, the distance d is not less than the radius R1 and not more than the radius R2. Here, the distance d is greater than the radius R1 and less than the radius R2. Here, the distance that the third housing 34 moves with respect to the first housing 12 from the first state to the second state is also the same as the distance d.

More specifically, as shown in FIG. 11, here, in the first state, the inner surface of the second cavity 26 and the inner surface of the third cavity 36 leave the entire portion of the first cavity 14 into which the sealing member 70 is fitted open as viewed in the X direction. Also, in the first state, the inner surface of the second cavity 26 and the inner surface of the third cavity 36 leave part of the opening of the first cavity 14 open and block off part thereof as viewed in the X direction. As shown in FIG. 13, in the second state, the inner surface **26*a* of the second cavity 26 and the inner surface 36*a* of the third cavity 36 approach each other close enough to appear to come into contact with each other, as viewed in the X direction. The area of the upper surface and lower surface of the wire barrel 57 that is covered by the regulatory surfaces 28*b*, 28*c*, 38*b* and 38*c* thus increases. Here, substantially the entire upper surface and lower surface of the wire barrel 57 are covered by the regulatory surfaces 28*b*, 28*c*, 38*b* and 38*c*. Note that the inner surface 26*a* of the second cavity 26 and the inner surface 36*a* of the third cavity 36** are separated at a distance from each other in the X direction, and thus do not actually come into contact.

Figure 14:
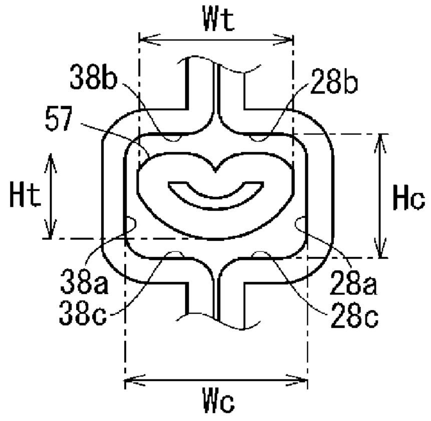
FIG. 14 is a schematic diagram showing gap dimensions between regulatory surfaces and the terminal-equipped wire in a second state.

FIG. 14 is a schematic diagram showing the gap dimensions between the regulatory surfaces **28*a*, 28*b*, 28*c*, 38*a*, 38*b* and 38*c* in the second state and the terminal-equipped wire 50**.

Here, the regulatory surfaces 28*a*, 28*b*, 28*c*, 38*a*, 38*b* and 38*c* are spaced from the second portion and the third portion. The regulatory surfaces 28*a*, 28*b*, 28*c*, 38*a*, 38*b* and 38*c* are spaced from the second portion and third portion in both the Y direction and the Z direction.

More specifically, a dimension We shown in FIG. 14 is the spacing in the Y direction between the regulatory surfaces 28*a* and 38*a*. Here, the dimension Wc is about twice the depth dimension of the small recess 28. A dimension Wt shown in FIG. 14 is the width dimension of the wire barrel 57 after crimping. The dimensions Wc and Wt referred to here are the dimensions when the terminal-equipped wire 50 is not fitted into the connector housing 10. The dimension Wc may be the same as the dimension Wt, or one of these dimensions may be larger than the other dimension. Here, the dimension Wc is larger than the dimension Wt. In other words, the wire barrel 57 is not in contact with at least one of the regulatory surfaces 28*a* and 38*a*. For example, the difference between the dimension Wc and the dimension Wt is preferably a value from 0.1 millimeters to 0.5 millimeters. Also, the dimension Wc and the dimension Wt are smaller than the diameter D1. Note that, in the case where the dimension Wc is smaller than the dimension Wt, during assembly, whichever of the wire barrel 57 and the regulatory surfaces 28*a* and 38*a* has higher rigidity (here, wire barrel 57) pushes the one having lower rigidity (here, regulatory surfaces 28*a* and 38*a*), resulting in the difference in dimensions therebetween being eliminated in the connector-equipped wire 1. Accordingly, in the case where the dimension Wc is the same as or smaller than the dimension Wt, the wire barrel 57 comes into contact with the regulatory surfaces 28*a* and 38*a* in the connector-equipped wire 1 after assembly.

Also, a dimension Hc shown in FIG. 14 is the spacing dimension between the regulatory surfaces 28*b* and 28*c* (width dimension of small recess 28). A dimension Ht shown in FIG. 14 is the height dimension of the wire barrel 57 after crimping. The dimensions Hc and Ht referred to here are dimensions prior to the terminal-equipped wire 50 being fitted into the connector housing 10. The dimension Hc may be the same as the dimension Ht, or one of these dimensions may be larger than the other dimension. Here, the dimension Hc is larger than the dimension Ht. In other words, the wire barrel 57 is not in contact with at least one of the regulatory surfaces 28*b* and 28*c*. For example, the difference between the dimension Hc and the dimension Ht is preferably a value from 0.1 millimeters to 0.5 millimeters. Also, the dimension Hc and the dimension Ht are smaller than the diameter D1. Note that, in the case where the dimension Hc is smaller than the dimension Ht, during assembly, whichever of the wire barrel 57 and the regulatory surfaces 28*b* and 28*c* has higher rigidity (here, wire barrel 57) pushes the one having lower rigidity (here, regulatory surfaces 28*b* and 28*c*), resulting in the difference in dimensions therebetween being eliminated in the connector-equipped wire 1. Accordingly, in the case where the dimension Hc is the same as or smaller than the dimension Ht, the wire barrel 57 comes into contact with the regulatory surfaces 28*b* and 28*c* in the connector-equipped wire 1 after assembly. The relationship between the wire barrel 57 and the regulatory surfaces 38*b* and 38*c* is similar to the relationship between the wire barrel 57 and the regulatory surfaces 28*b* and 28*c*.

Here, when changing from the first state to the second state, the second housing 24 and the third housing 34 move in the Y direction with respect to the first housing 12. The regulatory surfaces 28*a* and 38*a* facing in the Y direction thus tend to approach closer to the terminal-equipped wire 50 than the regulatory surfaces 28*b*, 28*c*, 38*b* and 38*c* facing in the Z direction. For example, the difference between the dimension Wc and the dimension Wt is smaller than the difference between the dimension Hc and the dimension Ht. Naturally, the difference between the dimension Wc and the dimension Wt may be the same as the difference between the dimension Hc and the dimension Ht, or may be larger.

Also, for example, the difference between the dimension We and the dimension Wt may be the same as or smaller than the compression amount of the sealing body 71 (difference between outer diameter D3 of sealing body 71 and inner diameter D1 of first cavity 14). The sealing body 71 thereby tends to remain compressed, even if the second portion and the third portion move greatly in the Y direction within the second housing 24 and the third housing 34. Similarly, for example, the difference between the dimension Hc and the dimension Ht may be the same as or less than the compression amount of the sealing body 71 (difference between outer diameter D3 of sealing body 71 and inner diameter D1 of first cavity 14). The sealing body 71 thereby tends to remain compressed, even if the second portion and the third portion move greatly in the Z direction within the second housing 24 and the third housing 34.

Effects

According to the connector housing 10 configured as described above and the connector-equipped wire 1 provided with the same, in the second state in which the second housing 24 is fully fastened to the first housing 12, vibration suppression of the terminal-equipped wires 50 inside the connector housing 10 is achieved, due to the regulatory surfaces 28*a*, 28*b* and 28*c* of the inner surface 26*a* of the second cavities 26 approaching closer to the second portion than when in the first state. It thereby becomes possible to suppress vibration of the terminal-equipped wires 50 inside the connector housing 10 without needing to provide a protrusion on the terminal.

Also, the first housing 12 and the second housing 24 are provided with temporary fastening portions for maintaining the first state. The first housing 12 and the second housing 24 are thereby easily held in position when inserting the terminals.

Also, the direction in which the regulatory surface 28*a* of the second cavity 26 approaches the second portion is different from the direction in which the regulatory surface 38*a* of the third cavity 36 approaches the third portion. The regulatory surface 28*a* of the second cavity 26 and the regulatory surface 38*a* of the third cavity 36 can face the terminal-equipped wire 50 from different directions to each other, and the terminal-equipped wires 50 are thereby even less likely to vibrate.

Also, the second housing 24 and the third housing 34 are formed in an identical shape to each other. An increase in the number of types of components constituting the connector housing 10 can thereby be suppressed.

Also, the second portion includes part of the terminal. The regulatory surfaces 28*a*, 28*b* and 28*c* of the second cavity 26 can thereby face the portion of the terminal-equipped wire 50 provided with the terminal, and lengthening of the connector housing 10 in the longitudinal direction of the wire 52 can be suppressed, compared with the case where the regulatory surfaces 28*a*, 28*b* and 28*c* of the second cavity 26 face the wire 52 of the terminal-equipped wire 50 that extends from the terminal. Also, the second portion includes the wire barrel 57 of the terminal. The regulatory surfaces 28*a*, 28*b* and 28*c* of the second cavity 26 can thereby face the wire barrel 57. The wire barrel 57 is sized to correspond to the crimping mold at the time of crimping to the wire 52, thus facilitating dimensional control thereof. Due to the regulatory surfaces 28*a*, 28*b* and 28*c* of the second cavity 26 facing the wire barrel 57, the distance between the regulatory surfaces 28*a*, 28*b* and 28*c* of the second cavity 26 and the wire barrel 57 is thus easy to stably control.

Also, the regulatory surfaces 28*a*, 28*b* and 28*c* of the second cavity 26 are a plurality of flat surfaces or at least one curved surface. Vibration of the terminal-equipped wires 50 is thereby easily suppressed in a plurality of directions, compared with the case where the regulatory surfaces 28*a*, 28*b* and 28*c* of the second cavities 26 are one flat surface.

Also, the bottom surface and two side surfaces of the recess 27 are the regulatory surfaces 28*a*, 28*b* and 28*c* of the second cavity 26. The regulatory surfaces 28*a*, 28*b* and 28*c* of the second cavity 26 can thereby face the second portion from a plurality of directions with a simple configuration.

Also, the regulatory surfaces 28*a*, 28*b* and 28*c* of the second cavity 26 are spaced from the second portion. Damage to the connector housing 10 is thereby suppressed.

Also, the first portion includes the sealing member 70. The portion of the terminal-equipped wire 50 that is on the rear end side with respect to the sealing member 70 is thereby restrained by the regulatory surfaces 28*a*, 28*b* and 28*c* of the second cavity 26.

Modifications

Figure 15:
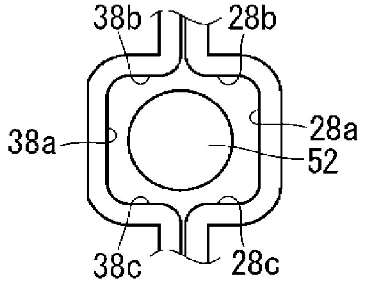
FIG. 15 is a schematic diagram showing a modification of the connector-equipped wire.

FIG. 15 is a schematic diagram showing a modification of the connector-equipped wire 1.

In a connector-equipped wire 101 according to the modification shown in FIG. 15, the second portion includes a portion of the wire 52 of the terminal-equipped wire 50 that extends from the terminal. The regulatory surfaces 28*a*, 28*b* and 28*c* of the second cavity 26 can thereby face a portion of the wire 52 of the terminal-equipped wire 50. In this case, the first housing body 13 (first cavity 14) may be extended in the X direction and the joint terminal 56 may be fitted into the first cavity 14 up to the wire barrel 57 or the insulation barrel 58. Also, in this case, the small recesses 28 and 38 may be formed in a semi-cylindrical shape having a diameter corresponding to the diameter of the wire 52.

Figure 16:
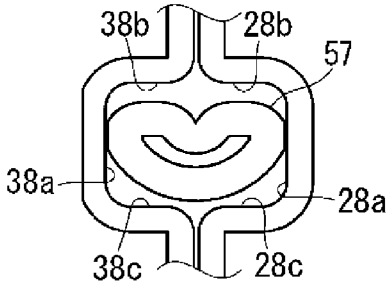
FIG. 16 is a schematic diagram showing another modification of the connector-equipped wire.

FIG. 16 is a schematic diagram showing another modification of the connector-equipped wire 1.

In a connector-equipped wire 201 according to the modification shown in FIG. 16, the regulatory surfaces 28*a* and 38*a* of the second cavity 26 and the third cavity 36 are respectively in contact with the second portion and the third portion. The dimension We is less than or equal to the dimension Wt. Vibration of the terminal-equipped wires 50 is thereby more easily suppressed.

In the example shown in FIG. 16, the regulatory surfaces 28*b*, 28*c*, 38*b*, 38*c* of the second cavity 26 and the third cavity 36 are not in contact with the second portion and the third portion. The dimension Hc is larger than the dimension Ht. The regulatory surfaces 28*b*, 28*c*, 38*b* and 38*c* of the second cavities 26 and the third cavities 36 may be in contact with the second portion and the third portion. The dimension Hc may be less than or equal to the dimension Ht.

In addition, the connector housing 10 is described above as being provided with temporary fastening portions for maintaining the insertion posture, but this configuration is not essential. In the case where the connector housing 10 is not provided with temporary fastening portions, the first housing 12 and the second housing 24 may be held in the insertion posture by other means such as a jig. This similarly applies to the first housing 12 and the third housing 34.

Also, although both the second housing 24 and the third housing 34 are described above as being provided, this configuration is not essential. Of the second housing 24 and the third housing 34, only the second housing 24 may be provided. Also, in the case where both the second housing 24 and the third housing 34 are provided, the second housing 24 and the third housing 34 are described above as having an identical shape to each other, but this configuration is not essential. The second housing 24 and the third housing 34 may be formed in different shapes to each other. Also, the second housing 24 and the third housing 34 are described as moving in opposite directions to each other with respect to the first housing 12 from the first state to the second state, but this configuration is not essential. The second housing 24 and the third housing 34 may move in directions other than opposite directions with respect to the first housing 12 from the first state to the second state. For example, the second housing 24 may move in the Y direction and the third housing 34 may move in the Z direction with respect to the first housing 12 from the first state to the second state.

Also, the terminal-equipped wire 50 is described above as being fitted into the recesses 27 and 37 of the second housing 24 and the third housing 34 in the second state, but this configuration is not essential. In the second state, the terminal-equipped wire 50 may not be fitted into the recesses 27 and 37 of the second housing 24 and the third housing 34. In this case, regulatory surfaces may approach in only the Y direction. Also, for example, regulatory surfaces may approach in the Y direction and the Z direction as follows. That is, from the first state to the second state, the second housing 24 and the third housing 34 move toward the first housing 12 in opposite directions that intersect the normal of the inner surface 26*a* of the second cavity 26 (e.g., directions forming 45-degree angle with Y and Z directions in YZ plane). At this time, the two inner surfaces forming one corner portion of the inner surface 26*a* of the second cavity 26 are regulatory surfaces that cover the terminal-equipped wire 50 from two directions (e.g., from above and right side), and the two inner surfaces forming one corner portion of the inner surface 36*a* of the third cavity 36 are regulatory surfaces that cover the terminal-equipped wire 50 from two other directions (e.g., from below and left side).

Also, the number of second cavities 26 and the number of third cavities 36 are described above as being less than the number of first cavities 14, but this configuration is not essential. The number of second cavities 26 and the number of third cavities 36 may be the same as the number of first cavities 14. In this case, recesses may not be provided in the second wall part 30 and the third wall part 40.

Note that the respective configurations described in the above embodiment and modifications can be combined as appropriate as long as there are no inconsistencies therebetween.

LIST OF REFERENCE NUMERALS

- 1 Connector-equipped electrical wire
- 10 Connector housing
- 12 First housing
- 13 First housing body
- 14 First cavity
- 15 First wall part
- 16, 17 Groove
- 16*a*, 17*a* Bottom surface
- 18 Temporary fastening recess (Temporary fastening portion)
- 19 Slit (full fastening portion)

20 Vehicle attachment part
21 Mounting hole
22 Sealing member mounting part
24 Second housing
25 Second housing body
26 Second cavity
26*a* Inner surface of second cavity
27 Recess of second cavity
28 Small recess of second cavity
28*a*, 28*b*, 28*c* Regulatory surface of second cavity
29 Large recess of second cavity
30 Second wall part
31 Fastening piece of second housing (temporary fastening portion, full fastening portion)
32 Support piece of second housing
33 Fastening protrusion of second housing
34 Third housing
35 Third housing main body
36 Third cavity
36*a* Inner surface of third cavity
37 Third cavity recess
38 Small recess of third cavity
38*a*, 38*b*, 38*c* Regulatory surface of third cavity
39 Large recess of third cavity
40 Third wall part
41 Fastening piece of third housing (temporary fastening portion, full fastening portion)
42 Support piece of third housing
43 Fastening protrusion of third housing
50 Terminal-equipped electrical wire
52 Coated wire
53 Conductor core wire
54 Insulation coating
56 Joint terminal
57, 59, 65 Wire barrel
58, 66 Insulation barrel
62 Connector terminal
63 Mating-side connection part
68 Relay conductor
70 Sealing member
71 Sealing body
72, 73 Protruding part
74 Through hole
S Sealing member

What is claimed is:

1. A connector-equipped electrical wire comprising:
a connector housing in which a cavity is formed; and
a terminal-equipped electrical wire including an electrical wire and a terminal connected to an end portion of the electrical wire, and inserted into the cavity,
wherein the connector housing includes a first housing and a second housing mounted on a rear end side of the first housing,
a first cavity is formed in the first housing as a portion of the cavity,
a second cavity is formed in the second housing as another portion of the cavity,
a portion of the terminal-equipped wire that is fitted into the first cavity is a first portion, and a portion of the terminal-equipped wire that is fitted into the second cavity is a second portion,
the connector housing is provided with a full fastening portion that maintains a mounted state of the first housing and the second housing,
in a first state before full fastening by the full fastening portion is achieved and in which the first cavity communicates with the second cavity corresponding thereto, the first portion is configured to pass through the second cavity and fit into the first cavity, and the second portion is fitted into the second cavity, and
in a second state in which full fastening by the full fastening portion is achieved, the terminal-equipped wire extends linearly from the first cavity to an outer side of the connector housing, and, when observed in an axial direction of the cavity, a regulatory surface of an inner surface of the second cavity approaches closer to the second portion than when in the first state,
wherein the second housing is configured to move in a direction perpendicular to the axial direction of the cavity when transitioning from the first state to the second state, and wherein the connector housing further includes a third housing mounted on a rear end side of the second housing, a third cavity is formed in the third housing as another portion of the cavity, a portion of the terminal-equipped wire that is fitted into the third cavity is a third portion, the first state is a state in which the third cavity communicates with the second cavity corresponding thereto, and the second state is a state in which the third housing is fully fastened to the first housing and the second housing, in the first state, the first portion and the second portion are respectively configured to pass through the third cavity and fit into the first cavity and the second cavity, and the third portion is fitted into the third cavity, in the second state, a regulatory surface of an inner surface of the third cavity approaches closer to the third portion than when in the first state, and a direction in which the regulatory surface of the second cavity approaches the second portion differs from a direction in which the regulatory surface of the third cavity approaches the third portion.

2. The connector-equipped electrical wire according to claim 1,
wherein the connector housing is provided with a temporary fastening portion that maintains the first state.

3. The connector-equipped electrical wire according to claim 1,
wherein the second housing and the third housing are formed in an identical shape to each other.

4. The connector-equipped electrical wire according to claim 1,
wherein the second portion includes part of the terminal.

5. The connector-equipped electrical wire according to claim 4,
wherein the second portion includes a wire barrel of the terminal.

6. The connector-equipped electrical wire according to claim 1,
wherein the second portion includes a wire portion of the terminal-equipped wire that extends from the terminal.

7. The connector-equipped electrical wire according to claim 1,
wherein the regulatory surface of the second cavity is a plurality of flat surfaces or at least one curved surface.

8. The connector-equipped electrical wire according to claim 7,
wherein a recess is formed in the inner surface of the second cavity,
in the second state, the second portion is fitted into the recess, and
a bottom surface of the recess and two side surfaces extending toward an opening of the recess from the bottom surface are the regulatory surface of the second cavity.

9. The connector-equipped electrical wire according to claim 1, wherein the regulatory surface of the second cavity is in contact with the second portion.

10. The connector-equipped electrical wire according to claim 1, wherein the regulatory surface of the second cavity is spaced from the second portion.

11. The connector-equipped electrical wire according to claim 1, wherein the terminal-equipped wire further includes a sealing member mounted on the terminal, and the first portion includes the sealing member.

12. The connector-equipped electrical wire according to claim 1, wherein the second housing includes a fastening piece that slides along a groove formed in the first housing during said perpendicular movement, and the perpendicular movement causes the regulatory surface to approach the second portion from a lateral direction to suppress vibration.

13. A connector housing in which a cavity for insertion of a terminal-equipped electrical wire is formed, the connector housing comprising:

a first housing; and a second housing mounted on a rear end side of the first housing, wherein a first cavity is formed in the first housing as a portion of the cavity, a second cavity is formed in the second housing as another portion of the cavity, a portion of the terminal-equipped wire that is fitted into the first cavity is a first portion, and a portion of the terminal-equipped wire that is fitted into the second cavity is a second portion, the connector housing is provided with a full fastening portion that maintains a mounted state of the first housing and the second housing, in a first state before full fastening by the full fastening portion is achieved and in which the first cavity communicates with the second cavity corresponding thereto, the first portion is configured to pass through the second cavity and fit into the first cavity, and the second portion is fitted into the second cavity, and in a second state in which the second housing is fully fastened to the first housing, part of an inner surface of the second cavity approaches closer to the second portion than when in the first state to enable the terminal-equipped wire to extend linearly from the first cavity to an outer side of the connector housing, wherein the second housing is configured to move in a direction perpendicular to the axial direction of the cavity when transitioning from the first state to the second state, and wherein the connector housing further includes a third housing mounted on a rear end side of the second housing, a third cavity is formed in the third housing as another portion of the cavity, a portion of the terminal-equipped wire that is fitted into the third cavity is a third portion, the first state is a state in which the third cavity communicates with the second cavity corresponding thereto, and the second state is a state in which the third housing is fully fastened to the first housing and the second housing, in the first state, the first portion and the second portion are respectively configured to pass through the third cavity and fit into the first cavity and the second cavity, and the third portion is fitted into the third cavity, in the second state, a regulatory surface of an inner surface of the third cavity approaches closer to the third portion than when in the first state, a direction in which the regulatory surface of the second cavity approaches the second portion differs from a direction in which the regulatory surface of the third cavity approaches the third portion, the second portion includes part of the terminal, and the terminal extends from the second portion to the third portion.

14. A connector-equipped electrical wire comprising:

a connector housing in which a cavity is formed; and a terminal-equipped electrical wire including an electrical wire and a terminal connected to an end portion of the electrical wire, and inserted into the cavity, wherein the connector housing includes a first housing and a second housing mounted on a rear end side of the first housing, a first cavity is formed in the first housing as a portion of the cavity, a second cavity is formed in the second housing as another portion of the cavity, a portion of the terminal-equipped wire that is fitted into the first cavity is a first portion, and a portion of the terminal-equipped wire that is fitted into the second cavity is a second portion, the connector housing is provided with a full fastening portion that maintains a mounted state of the first housing and the second housing, in a first state before full fastening by the full fastening portion is achieved and in which the first cavity communicates with the second cavity corresponding thereto, the first portion is configured to pass through the second cavity and fit into the first cavity, and the second portion is fitted into the second cavity, in a second state in which full fastening by the full fastening portion is achieved, when observed in an axial direction of the cavity, a regulatory surface of an inner surface of the second cavity approaches closer to the second portion than when in the first state, the connector housing further includes a third housing mounted on a rear end side of the second housing, a third cavity is formed in the third housing as another portion of the cavity, a portion of the terminal-equipped wire that is fitted into the third cavity is a third portion, the first state is a state in which the third cavity communicates with the second cavity corresponding thereto, and the second state is a state in which the third housing is fully fastened to the first housing and the second housing, in the first state, the first portion and the second portion are respectively configured to pass through the third cavity and fit into the first cavity and the second cavity, and the third portion is fitted into the third cavity, in the second state, a regulatory surface of an inner surface of the third cavity approaches closer to the third portion than when in the first state, a direction in which the regulatory surface of the second cavity approaches the second portion differs from a direction in which the regulatory surface of the third cavity approaches the third portion, and in the second state, the terminal-equipped wire extends linearly from the second cavity to the third cavity, wherein the second housing is configured to move in a direction perpendicular to the axial direction of the cavity when transitioning from the first state to the second state.

* * * * *